United States Patent
Khozikov et al.

(10) Patent No.: US 11,967,842 B2
(45) Date of Patent: Apr. 23, 2024

(54) SMART BATTERY DISCONNECT AND PROTECTION ARCHITECTURE FOR AIRBORNE HIGH-POWER MODULAR MULTI-STRING BATTERY PACK

(71) Applicant: The Boeing Company, Chicago, IL (US)

(72) Inventors: Vyacheslav Khozikov, Bellevue, WA (US); Frederic Lacaux, Woodinville, WA (US); Eugene V. Solodovnik, Lake Stevens, WA (US); John A. Trela, Seattle, WA (US); Kamiar J. Karimi, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 421 days.

(21) Appl. No.: 17/373,838

(22) Filed: Jul. 13, 2021

(65) Prior Publication Data
US 2022/0115878 A1  Apr. 14, 2022

Related U.S. Application Data

(60) Provisional application No. 63/089,729, filed on Oct. 9, 2020.

(51) Int. Cl.
*H02J 7/00* (2006.01)

(52) U.S. Cl.
CPC ........ *H02J 7/0031* (2013.01); *H02J 7/00714* (2020.01); *H02J 7/007194* (2020.01)

(58) Field of Classification Search
USPC ....................................................... 320/136
See application file for complete search history.

(56) References Cited

U.S. PATENT DOCUMENTS

| 8,760,094 B2 | 6/2014 | Solodovnik et al. |
| 9,846,199 B2 | 12/2017 | Vian et al. |

(Continued)

FOREIGN PATENT DOCUMENTS

| EP | 2945243 A1 | 11/2015 |
| EP | 3648292 A1 | 5/2020 |

OTHER PUBLICATIONS

Extended European Search Report (EESR) dated Mar. 9, 2022, in European Patent Application No. 21200881.7 (European counterpart of the instant patent application).

(Continued)

*Primary Examiner* — Samuel Berhanu
(74) *Attorney, Agent, or Firm* — Ostrager Chong Flaherty & Broitman P.C.

(57) ABSTRACT

Methods and systems for protection/disconnect of airborne high-power/energy high-voltage modular multi-string battery packs (such as battery packs for airborne electric propulsion systems). The methods and systems are based on a dissimilar/redundant distributed battery pack protection architecture and use a smart mid-point battery disconnect in conjunction with centralized battery management system. The resulting battery disconnect/protection system is configured to detect bus faults, load faults and string faults and then take appropriate action to isolate the detected fault. For example, in response to a short circuit in one battery string, the faulty battery string may be disconnected from the positive and negative busbars while the remaining battery strings continue to provide power.

21 Claims, 24 Drawing Sheets

(56) References Cited

U.S. PATENT DOCUMENTS

| | | |
|---|---|---|
| 10,283,982 B2 | 5/2019 | Namou et al. |
| 10,330,739 B2 | 6/2019 | Quiambao et al. |
| 10,389,227 B2 | 8/2019 | Hokazono et al. |
| 10,473,710 B2 | 11/2019 | Sullivan |
| 2012/0091964 A1 | 4/2012 | Vance et al. |
| 2014/0104734 A1 | 4/2014 | Prisse et al. |
| 2015/0311832 A1 | 10/2015 | Solodovnik et al. |
| 2017/0214258 A1 | 7/2017 | Namou et al. |
| 2017/0279287 A1 | 9/2017 | Solodovnik et al. |
| 2018/0145520 A1 | 5/2018 | Sasaki et al. |
| 2019/0123542 A1* | 4/2019 | Kambham ........... G01R 31/007 |
| 2020/0039358 A1* | 2/2020 | Duan ..................... B60L 50/60 |

OTHER PUBLICATIONS

Lian et al. "High-Voltage Safety Improvement Design for Electric Vehicle in Rear Impact", published Aug. 20, 2018 in Automotive Innovation (2018) 1:211-225.

* cited by examiner

SMART BATTERY DISCONNECT AND PROTECTION ARCHITECTURE FOR AIRBORNE HIGH-POWER MODULAR MULTI-STRING BATTERY PACK

RELATED PATENT APPLICATION

This application claims the benefit, under Title 35, United States Code, Section 119(e), of U.S. Provisional Application No. 63/089,729 filed on Oct. 9, 2020.

BACKGROUND

This disclosure generally relates to systems and methods for managing a battery modular system that provides direct current (DC) power onboard a vehicle, such as an aircraft.

When electric motors are used for propulsion of the aircraft, electrical energy is supplied by a power source. For instance, electrical energy may be supplied by a DC power source that includes strings of battery modules. In one implementation, the batteries are connected to a high-voltage direct-current (HVDC) bus. As used herein, the term "connected" means coupled for supplying electrical power and the term "disconnected" means de-coupled to not supply electrical power. As used herein, the term "high voltage" in the context of direct current means any DC voltage higher than 600 $V_{DC}$.

In some aircraft all-electric or hybrid electric propulsive systems, high-capacity high-voltage (e.g., 600/1000/2000 $V_{DC}$) battery packs are used to provide power to large electric motors. Aircraft battery packs may have architectures with multiple strings arranged in parallel to ensure sufficient power flow into a load(s) at a fixed level of operational. In airborne applications, levels of safety and criticality for high-power/high-voltage electrical protections are stringent, requiring multiple dissimilar redundant protections, fail-safe and shutdown mechanisms. (As used herein, the term "fail-safe" means a design feature or practice which, in the event of a specific type of failure, inherently responds in a way that will prevent or mitigate unsafe consequences of the system's failure.) Airborne applications require an extremely high level of criticality and integrity for battery overcharge protection or other events or combination of events that could lead to battery thermal runaway.

Additionally, electric propulsive systems require protection against short circuits. (As used herein, the term "short circuit" means an electrical circuit that allows a current to travel along an unintended path with no or very low electrical impedance.) A common type of short circuit occurs when the positive and negative terminals of a battery are connected by means of a low-resistance conductor. With a low resistance in the connection, the resulting high current flowing through a battery can cause a rapid increase of temperature. During short-circuit failure, high-voltage battery packs are capable of creating short-circuit current exceeding, for example, ~3,500 $A_{DC}$ per string depending on the number and type of parallel cells, which is equivalent to or above ~10,000 $A_{DC}$ at system level, depending on the number of parallel strings. The combination of high operating voltage (600 to 1000 $V_{DC}$) and high short-circuit current (3,500 $A_{DC}$/string; equivalent ~10,000 $A_{DC}$ system) make the development of protection systems a challenging task. The airborne constraints such as high voltage (>1000 $V_{DC}$), operating altitude (55,000 feet), vibration environment, and operating life (25 years) are exacerbating factors.

A battery management system is any electronic system that manages a rechargeable battery by protecting the battery against unsafe operation, monitoring the state of the battery, calculating and reporting secondary data, controlling the environment, and balancing. A battery built together with a battery management system with a communication data bus is referred to as a "smart battery".

A battery management system may monitor the state of a battery as represented by various parameters, such as: total voltage, voltages of individual cells, average temperature, temperatures of individual cells, state of charge (SOC) to indicate the charge level of the battery, state of health (SOH) to indicate the remaining capacity of the battery, state of power (SOP) to indicate the amount of power available for a defined time interval, and other parameters. The battery management system will also control the recharging of the battery. The battery management system may also be configured to manage the battery temperature. The central controller of a battery management system communicates internally with hardware that operates at the cell level. A battery management system may protect its battery by preventing over-current (may be different in charging and discharging modes), over-voltage (during charging), under-voltage (during discharging), over-temperature, under-temperature, ground fault or leakage current detection.

Battery architecture and protection/disconnect systems for battery packs used in aircraft electric propulsion have not reached a point of standardization. There is ample scope for designing innovative aircraft battery packs having a protection/disconnect architecture that enhances aircraft safety without exceeding weight/volume constraints.

SUMMARY

The subject matter disclosed in some detail below is directed to methods and systems for protection/disconnect of airborne high-power/energy high-voltage modular multi-string battery packs (such as battery packs for airborne electric propulsion systems). The methods and systems disclosed herein focus on operation of an aircraft battery pack having a protection and disconnect architecture. More specifically, the systems and methods are based on a dissimilar/redundant distributed battery pack protection architecture and use a smart mid-point battery disconnect in conjunction with a centralized battery pack management system (BPMS).

As used herein, the term "battery module" means a battery that includes a single battery cell or a multiplicity of battery cells wired in series, parallel, or a mixture thereof. As used herein, the term "battery string" means a plurality of battery modules wired in series. As used herein, the term "battery pack" includes a single battery string or a plurality of battery strings wired in parallel. As used herein, the term "high-power/energy" means high specific power or high specific energy. As used herein, the term "specific energy" defines battery capacity in weight (Wh/kg). As used herein, the term "specific power" indicates loading capability (W). As used herein, the modifier "smart" means that action is initiated or a device is controlled by a computer or processor based on received sensor data indicating the current state of the battery system.

An architecture suitable for airborne applications include one or more of the following features: (1) a modular/scalable multi-string battery pack system protection/disconnect architecture; (2) redundant/dissimilar protection architecture for critical events such as overcharge, over discharge, over-temperature, and short circuit; (3) fail-safe disconnect architecture for the battery pack protection with dissimilar technologies capable of disconnecting a battery pack with voltage higher than 1000 $V_{DC}$ and string short-circuit current higher than 2,000 $A_{DC}$ without using a high-voltage vacuum-sealed hermetic contactor and high-voltage fuse combination; (4) resettable structure enabling protection of the battery in case of a system short circuit without requiring battery maintenance before returning to service after a load/system short circuit; (5) the capability to implement fast protection for short-circuit current (differential protection, ground fault circuit interruption, instant trip, etc.) in order to minimize the fault incidental energy, potential surrounding structural damage, and stress on components such as battery cell fusible links; (6) the capability to isolate an internal battery pack short circuit without melting or stressing the battery cell fusible link and preventing any arcing phenomena inside the battery; (7) soft start capability for capacitive load without requiring additional hardware; (8) elimination of single-point failure by implementing immune-to-false-positives fault detection architecture; (9) (N−1) pack redundancy for loss of string to improve availability and safety for propulsive applications; and (10) a weight-optimized solution (not using large high-voltage components such as a high-voltage contactor/high-voltage fuse derived from a train/terrestrial substation).

Although various embodiments of systems and methods for smart battery protection/disconnect in airborne high-power/energy high-voltage modular multi-string battery packs will be described in some detail below, one or more of those embodiments may be characterized by one or more of the following aspects.

One aspect of the subject matter disclosed in detail below is a battery system comprising: positive and negative busbars; a battery pack comprising a first battery string that includes first and second half-strings; a first string contactor connected to the positive busbar and to the first half-string; a first mid-point disconnect circuit connected to the first and second half-strings; a first mid-point current sensor configured to measure current flowing through the first mid-point disconnect circuit; and a first smart mid-point disconnect unit configured to open the first mid-point disconnect circuit and the first string contactor following receipt of an output from the first mid-point current sensor indicating over-current flowing through the first mid-point disconnect circuit. When the battery pack further comprises a second battery string that includes third and fourth half-strings, the system further comprises: a third string contactor connected to the positive busbar and to the third half-string; a second mid-point disconnect circuit connected to the third and fourth half-strings; a second mid-point current sensor configured to measure current flowing through the second mid-point disconnect circuit; and a second smart mid-point disconnect unit configured to open the second mid-point disconnect circuit and the third string contactor in response to receipt of an output from the second mid-point current sensor indicating over-current flowing through the second mid-point disconnect circuit.

In accordance with some embodiments, the battery system described in the immediately preceding paragraph further comprises a battery pack management system which is communicatively coupled to the first and second smart mid-point disconnect units. In addition, the battery system further comprises: a first load contactor connected to the positive busbar; a second load contactor connected to the negative busbar; and a load current sensor configured to measure current flowing through the first load contactor, wherein the battery pack management system is configured to: open the first and second load contactors following receipt of data from the load current sensor indicating a load fault; and close the first and second mid-point disconnect circuits after opening the first and second load contactors. The battery system may further comprise: a fourth string contactor connected to the negative busbar and to the fourth half-string; a first end-point current sensor configured to measure current flowing through the first string contactor; and a second end-point current sensor configured to measure current flowing through the third string contactor, wherein the battery pack management system is configured to: compute a first difference between the currents measured by the first mid-point current sensor and first end-point current sensor; open the first and second string contactors in response to the first difference being greater than a specified threshold; compute a second difference between the currents measured by the second mid-point current sensor and second end-point current sensor; and open the third and fourth string contactors in response to the second difference being greater than the specified threshold.

Another aspect of the subject matter disclosed in detail below is a battery system comprising: positive and negative busbars; a battery string comprising first and second half-string, the first half-string comprising a first plurality of battery modules connected in series and the second half-string comprising a second plurality of battery modules connected in series; a string contactor connected to the positive busbar and to the first half-string; a mid-point disconnect circuit connected to the first and second half-strings; a mid-point current sensor configured to measure current flowing through the mid-point disconnect circuit; a smart mid-point disconnect unit configured to open the mid-point disconnect circuit following receipt of an output from the mid-point current sensor indicating over-current flowing through the mid-point disconnect circuit; and a plurality of first module monitoring units communicatively coupled to the smart mid-point disconnect unit, each first module monitoring unit comprising sensors for measuring virtual cell voltage and individual cell temperature inside a respective battery module, wherein the first smart mid-point disconnect unit is further configured to control a balancing function performed by the balancing circuit as a function of the measured virtual cell voltage and individual cell temperature. The battery system may further comprise: a battery pack management system which is communicatively coupled to the smart mid-point disconnect unit; and a plurality of second module monitoring units communicatively coupled to the battery pack management system, each second module monitoring unit comprising sensors for measuring virtual cell voltage and individual cell temperature inside a respective battery module.

A further aspect of the subject matter disclosed in detail below is a method for operating a battery system comprising a battery string connected across positive and negative busbars via a pair of string contactors when the string contactors are closed, the battery string comprising a pair of half-strings connected in series via a mid-point disconnect circuit, the method comprising: measuring currents flowing through the mid-point disconnect circuit; determining that the measured current in the mid-point disconnect circuit exceeds a threshold indicating an over-current; and opening the mid-point disconnect circuit in response to the determination that the measured current exceeds the threshold. In accordance with some embodiments, the method further comprises opening the string contactors connected to the faulty battery string after opening the mid-point disconnect circuit of the faulty battery string; and activating a pyro fuse connected in series with the mid-point disconnect circuit in response to failure of the mid-point disconnect circuit to open.

Yet another aspect is a method for operating a battery system comprising a battery string connected across positive and negative busbars via a pair of string contactors when the string contactors are closed, the battery string comprising a pair of half-strings connected in series via a mid-point disconnect circuit, the method comprising: measuring current flowing through the mid-point disconnect circuit; measuring current flowing through the string contactor that connects the battery string to the positive busbar; computing a difference between the measured currents; determining that the difference exceeds a threshold indicating a string fault; and opening the mid-point disconnect circuit and then opening the string contactors in response to the determination that the difference exceeds the threshold.

Other aspects of systems and methods for smart battery protection/disconnect in airborne high-power/energy high-voltage modular multi-string battery packs are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

Reference will hereinafter be made to the drawings in which similar elements in different drawings bear the same reference numerals.

DETAILED DESCRIPTION

Illustrative embodiments of systems and methods for smart battery protection/disconnect in airborne high-power/energy high-voltage modular multi-string battery packs are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
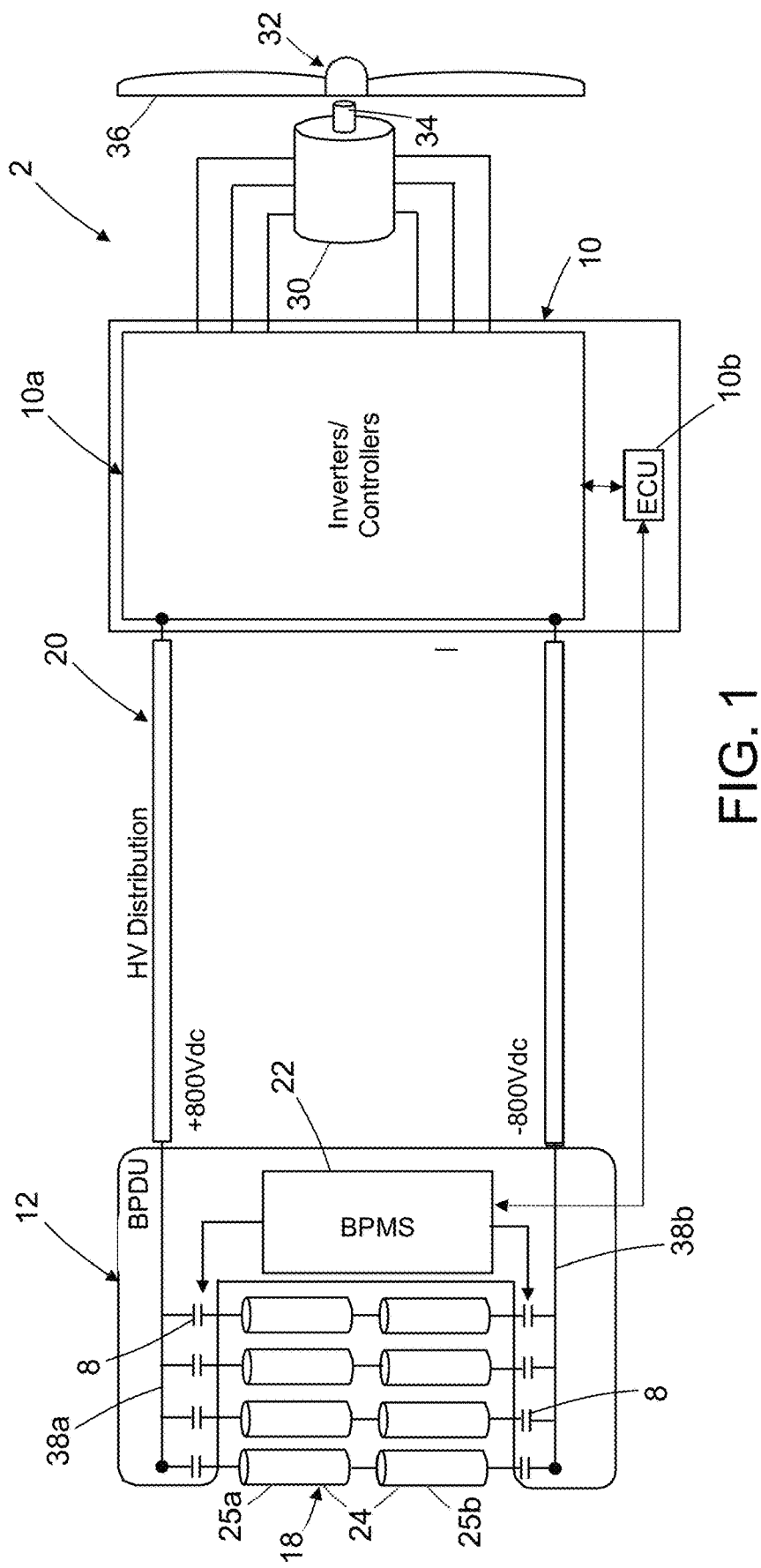
FIG. 1 is a diagram representing an aerospace electric propulsion system architecture with a single propulsor in accordance with one embodiment.

FIG. 1 is a diagram representing an aerospace electric propulsion system architecture with a single propulsor 2 in accordance with one embodiment. The propulsor 2 partly depicted in FIG. 1 includes a motor controller 10, an AC motor 30 controlled by the motor controller 10, and a propeller 32 driven to rotate by the AC motor 30. The propeller 32 includes a propeller shaft 34 which is mechanically coupled to the output shaft of the AC motor 30 and a plurality of propeller blades 36.

In some implementations, the motor controller 10 has three channels for providing AC current to respective sets of stator windings in the AC motor 30. Each channel of the motor controller 10 comprises a respective inverter having power switches and a respective inverter controller which controls the states of the power switches (collectively referred to herein as "inverters/controllers"). The inverters are connected in parallel to windings (not shown in FIG. 1) of the AC motor 30. The operation of the inverters is controlled by the controllers, which send switch control signals to and receive switch state signals from the inverters via switch signal lines (not shown in FIG. 1). The inverters convert DC power into multi-phase AC power for the AC motor 30.

As seen in FIG. 1, the motor controller 10 further includes an electric propulsion controller 10b (hereinafter "EPC 10b"). The inverter controllers (not shown in FIG. 1) are communicatively coupled to receive control signals from EPC 10b and send feedback signals to EPC 10b. The EPC 10b performs a role of supervision and coordination for all inverter controllers. The EPC 10b receives pilot thrust and pitch inputs from a thrust control lever and a pitch control lever (not shown in FIG. 1). The EPC 10b supervises and coordinates operation of the inverter controllers based on information from sensors and the pilot inputs.

In the embodiment depicted in FIG. 1, the HVDC power source is a battery pack 18. The battery pack 18 is connected to a HVDC power distribution system 20 via a battery power distribution unit (BPDU) 12. The BPDU 12 is essentially an enclosure that contains hardware needed for monitoring, commutating, and controlling the DC power output by the battery pack 18. The motor controller 10 receives that DC power via the HVDC power distribution system 20.

In accordance with some embodiments, the battery pack 18 includes a plurality of independent battery strings 24. Each battery string 24 comprises a number of battery modules connected in series to produce a battery string with the required usable voltage/potential. In the example depicted in FIG. 1, each battery string includes a first half-string 25a of (e.g., four) series-connected battery modules indirectly connected (via a respective mid-point battery disconnect unit not shown in FIG. 2) to a second half-string 25b of (e.g., four) of series-connected battery modules.

The battery power distribution unit 12 includes positive and negative high-voltage busbars 38a and 38b (hereinafter "high-voltage busbars 38a and 38b"). The battery power distribution unit 12 further includes a first plurality of string contactors 8 that connect one end of the battery strings 24 to high-voltage busbar 38a and a second plurality of string contactors 8 that connect the other end of the battery strings 24 to high-voltage busbar 38b. (A contactor is an electrically controlled switch used for switching an electrical power circuit. Contactors are designed to be directly connected to high-current load devices.) A high-voltage DC power distribution system 20 receives DC power signals from the battery string 24 via string contactors 8 and supplies that DC power to the motor controller 10.

The battery power distribution unit 12 further includes a battery pack management system 22 (hereinafter "BPMS 22"). The operation of the battery pack 18 is managed by the BPMS 22. Multiple parallel battery strings may provide redundancy in case of pack internal failure. The BPMS 22 may be configured to ensure redundant protections, fail-safe operation, and selective shutdown of battery strings. The BPMS 22 may be further configured to provide battery overcharge protection or to forestall other events or combination of events that could lead to battery thermal runaway. More specifically, the switching states of the string contactors 8 are controlled by BPMS 22.

Still referring to FIG. 1, the EPC 10b interfaces with BPMS 22. The EPC 10b sends digital torque control signals to the inverter controllers and analog pitch control signals to a governor (not shown in FIG. 1). The governor may be a constant-speed propeller governor configured to keep the propeller rpm constant by varying the propeller blade pitch. Hydraulic governors accomplish this by using a hydraulic valve to control the flow of engine oil through hydraulic mechanisms in the propeller 32.

Figure 2:
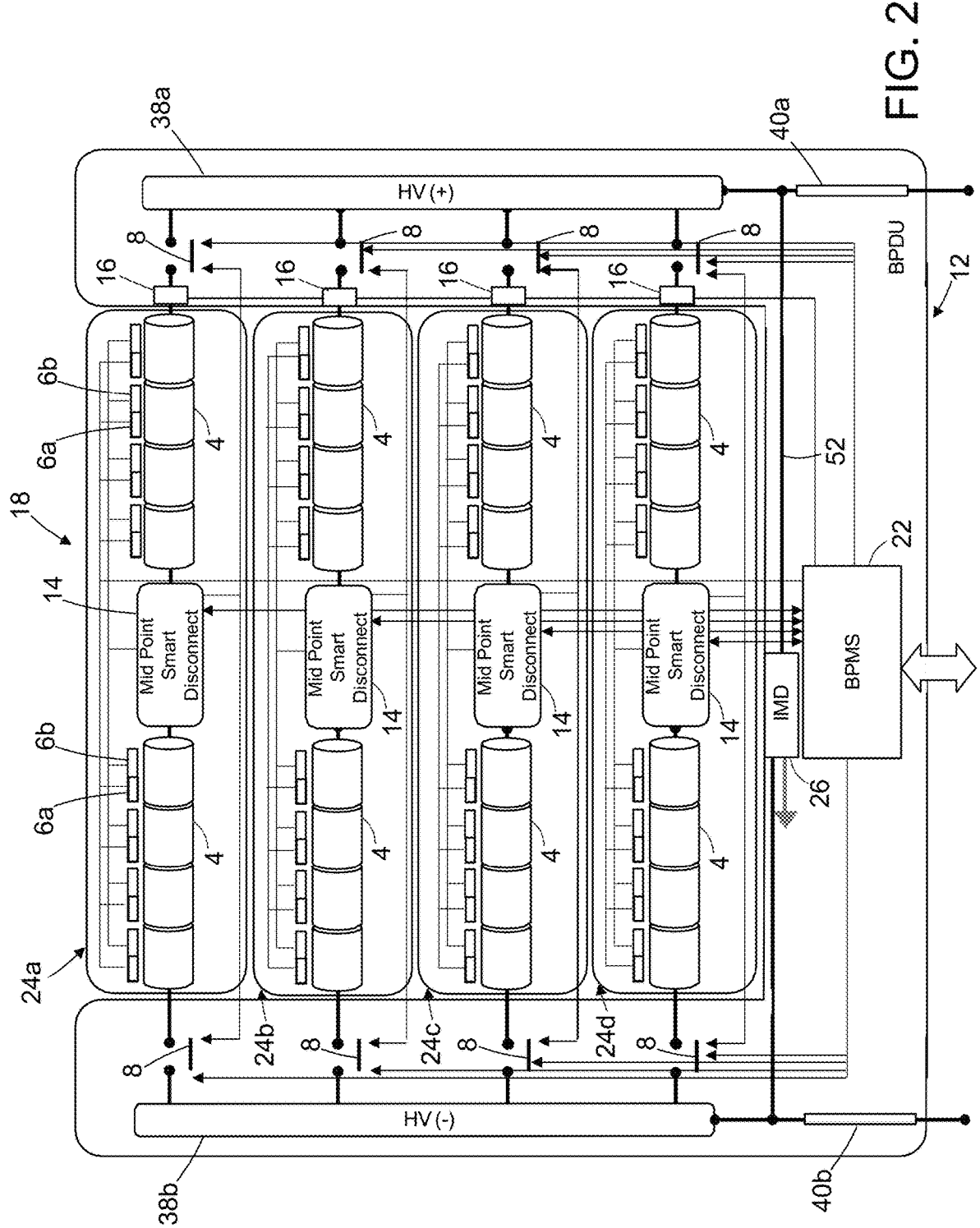
FIG. 2 is a diagram representing a battery multi-string architecture in accordance with one embodiment having four battery strings, each string consisting of two sets of four battery modules connected in series via a respective smart mid-point battery disconnect subsystem.

FIG. 2 is a diagram representing a battery multi-string architecture in the form of a battery pack 18 that includes multiple independent battery strings in accordance with one embodiment. In the example depicted in FIG. 2, battery pack 18 includes four battery strings 24a-24d. Each battery string consists of two sets of several (four in this embodiment) battery modules 4 connected in series and further connected in series to each other via a respective (smart) mid-point battery disconnect subsystem 14. Each string is built with multiple battery modules 4 connected in series (eight battery modules per string in the example depicted in FIG. 2). Each of the battery strings 24a-24d further includes respective pluralities of module monitoring units 6a and 6b. A respective pair of module monitoring units 6a and 6b monitor the state of each battery module. Each of the battery strings 24a-24d supplies DC power to high-voltage busbars 38a and 38b via respective string contactors 8. DC power from high-voltage busbars 38a and 38b is distributed to all HVDC loads.

As seen in FIG. 2, each of battery strings 24a-24d has a dedicated set of string contactors 8 located in the plus and the minus sides to provide galvanic isolation string by string. The battery strings 24 are connected together in the battery power distribution unit 12 via the high-voltage busbars 38a and 38b when the string contactors 8 are closed. Additionally, a respective dedicated end-point current sensor 16 (e.g., a Hall effect current sensor) is disposed between the contactor 8 connecting each half-string 25a to the positive (or negative) high-voltage busbar 38a. The BPMS 22 is configured (e.g., programmed) to control the different positive and negative string contactors 8 depending on the operating mode (charge, discharge, etc.) and system/pack protection (system short-circuit protection, unbalanced string current, etc.). Each pair of positive and negative string contactors 8 is under dual control by a respective mid-point battery disconnect subsystem 14 and the BPMS 22. The BPMS 22 is communicatively coupled to all mid-point battery disconnect subsystems 14 for coordination purposes. The BPMS 22 is in charge of communicating with the autopilot and others line-replaceable units of the electrical propulsion system.

The battery power distribution unit 12 depicted in FIG. 2 also includes an integrated neutral grounding network 52 (connected across battery power output lines 40a and 40b) and an insulation monitoring device 26 (hereinafter "IMD 26"). The battery pack neutral is connected to mechanical ground though the neutral grounding network 52. The grounding impedance is used to balance the positive and negative bus voltages taking into account the parasitic positive and negative impedances to ground as well as the overall insulating impedance required to guarantee personal safety. For example, a grounding switch can be used to lift the ground connection for sleep mode. The IMD 26 (described in more detail below) dynamically and actively monitors resistance to ground.

Figure 2A:
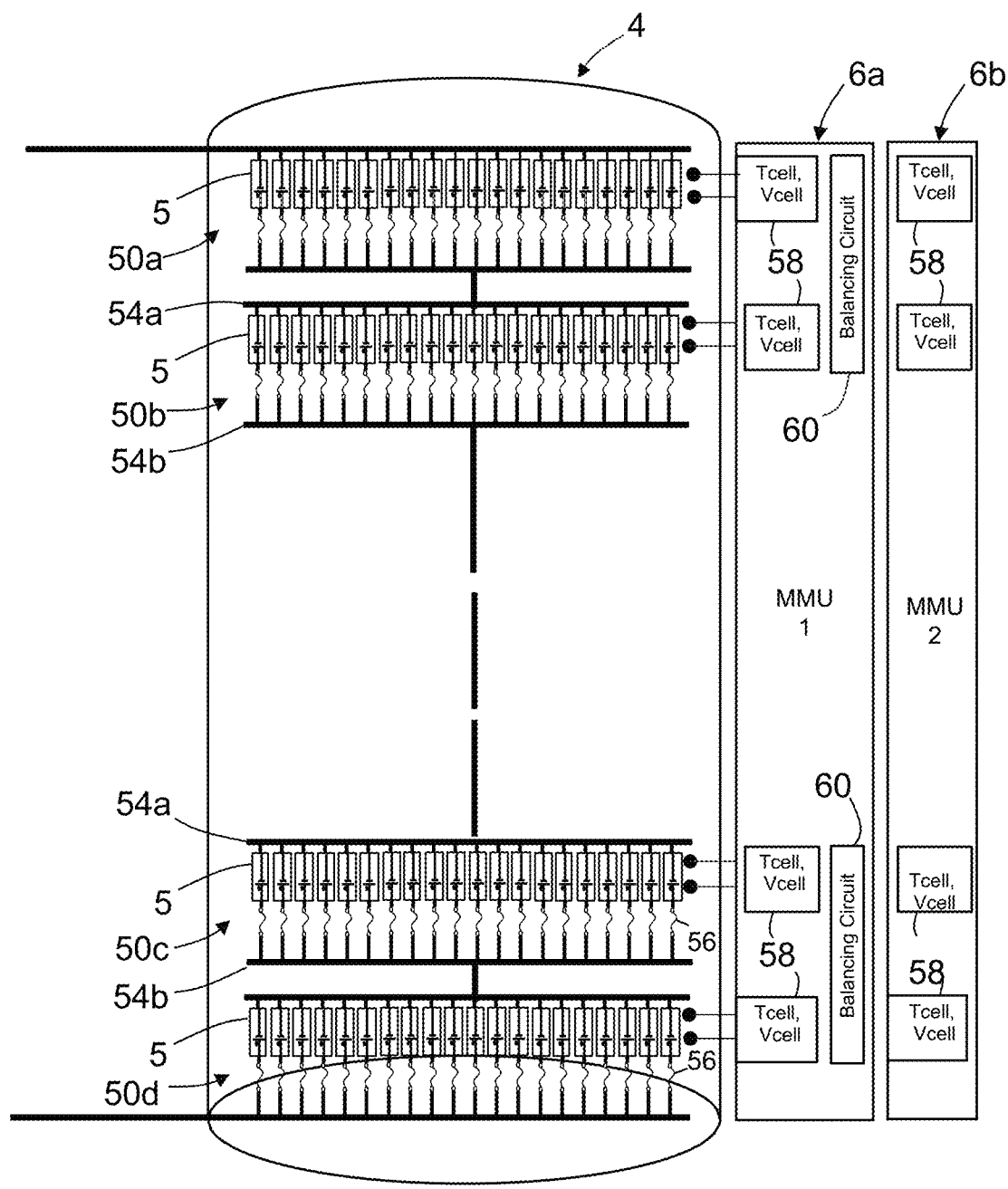
FIG. 2A is a diagram representing a single battery module and associated module monitoring units in accordance with one proposed implementation.

FIG. 2A is a diagram representing a single battery module 4 and associated module monitoring units 6a and 6b in accordance with one proposed implementation. Each battery module 4 is a parallel/series arrangement of individual cells 5. In the example depicted in FIG. 2A, the battery module 4 includes four rows of cells 5, each row including twenty cells connected in parallel across a pair of cell busbars 54a and 54b. Each parallel cell arrangement is considered to be a virtual cell (or brick). The four virtual cells 50a-50d are connected in series. The cell arrangement is done using a respective fusible link 56 in series with each individual cell 5 to protect against cell failure. The elementary module configuration is selected taking into account tradeoffs of safe voltage, manageable weight, volume, and failure containment.

Each battery module 4 is monitored by two independent dissimilar module monitoring units 6a and 6b (labeled MMU1 and MMU2 in FIG. 2A). Each module monitoring unit includes sensors 58 for independently measuring each virtual cell voltage and each individual cell temperature. The module monitoring units 6a also includes balancing circuits 60. The balancing circuits 60 perform a passive (or active) balancing function that is activated and controlled by the associated mid-point battery disconnect subsystem 14. Module monitoring unit 6a communicates sensor data representing virtual cell voltage and individual cell temperature to the associated mid-point battery disconnect subsystem 14. In the charge mode, the smart mid-point battery disconnect subsystem 14 sends commands to the balancing circuits 60 to guarantee proper balancing from virtual cell to virtual cell. Module monitoring unit 6b communicates sensor data representing virtual cell voltage and individual cell temperature to the BPMS 22. Additionally, module monitoring unit 6b can provide an aggregated flag for cell voltage and cell temperature out of bounds.

Short circuits in internal cells can cause batteries to experience thermal runaway, which can cause the batteries to fail. Typically, anode and cathode portions of a cell are separated by an insulative barrier. However, insulative barriers can deteriorate such that a short circuit is created between the cathode and anode portions through the barrier. This internal short circuit reduces the internal resistance of the battery, thereby increasing the likelihood of overcharging or over-discharging the cell, which in turn increases the cell temperature and can eventually lead to thermal runaway.

Figure 3:
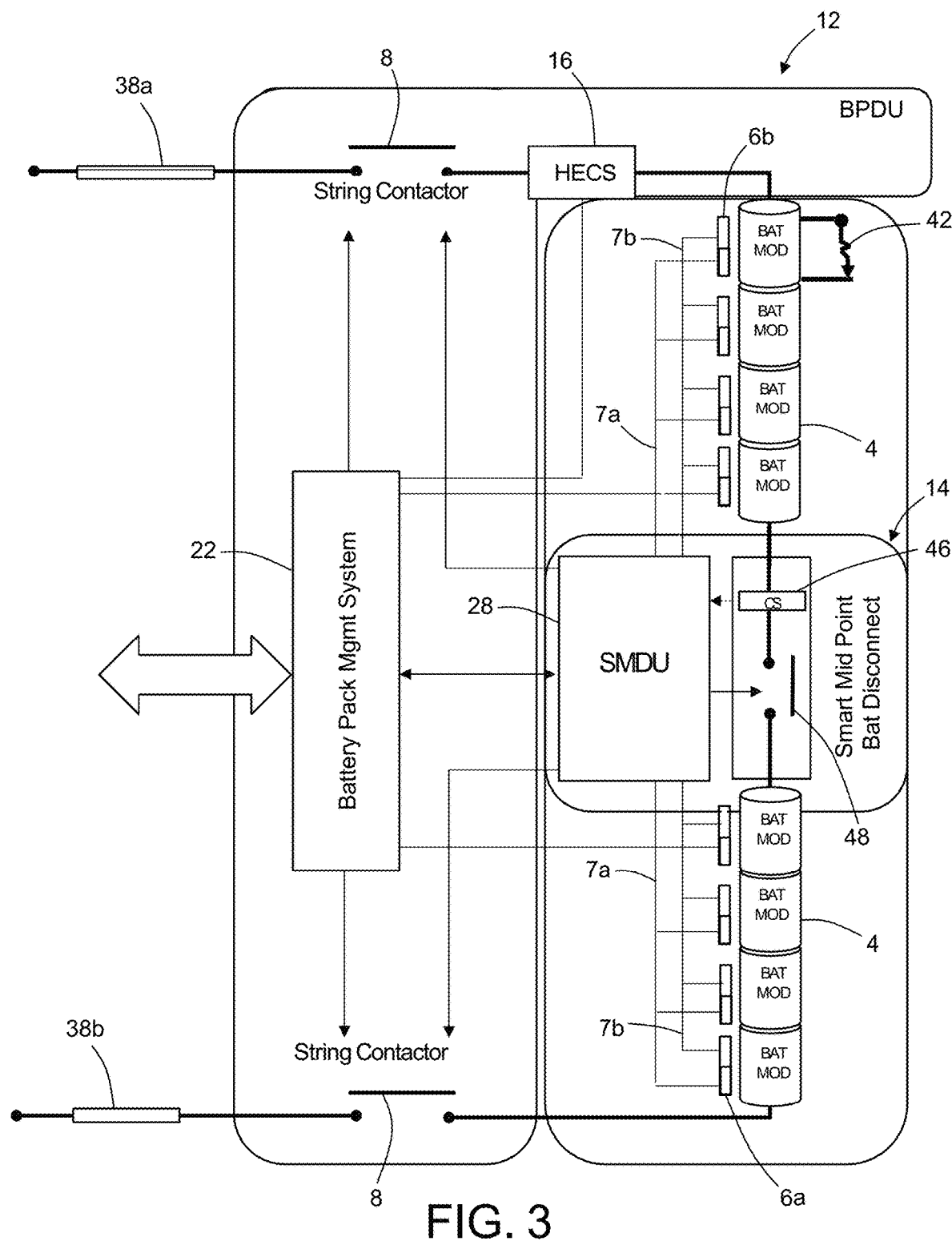
FIG. 3 is a diagram representing a portion of the system depicted in FIG. 2 and including internal components of a mid-point battery disconnect subsystem in accordance with one embodiment. The battery string is shown in a state wherein a battery cell internal short circuit has occurred inside one virtual cell.

FIG. 3 is a diagram representing a portion of the system depicted in FIG. 2 and including internal components of a mid-point battery disconnect subsystem 14 in accordance with one embodiment. The battery string 24 is shown in a state wherein a battery cell internal short circuit 42 has occurred inside one virtual cell. The mid-point battery disconnect subsystem 14 includes a smart mid-point disconnect unit 28 (hereinafter "SMDU 28") and a mid-point disconnect contactor 48. The SMDU 28 includes a processor configured to control the state of the mid-point disconnect contactor 48. The SMDU 28 is communicatively coupled to the BPMS 22. The mid-point battery disconnect subsystem 14 further includes a mid-point current sensor 46 which outputs an electrical signal to SMDU 28 representing the current flowing through mid-point battery disconnect subsystem 14 when the mid-point disconnect contactor 48 is closed. The SMDU 28 also receives electrical signals representing the individual cell temperatures and virtual cell voltages from the module monitoring units 6a and 6b via an MMU1/SMDU data bus 7a and an MMU2/BPMS data bus 7b. The BPMS 22 and the SMDU 28 are configured to independently control the states of the string contactors 8.

Figure 4:
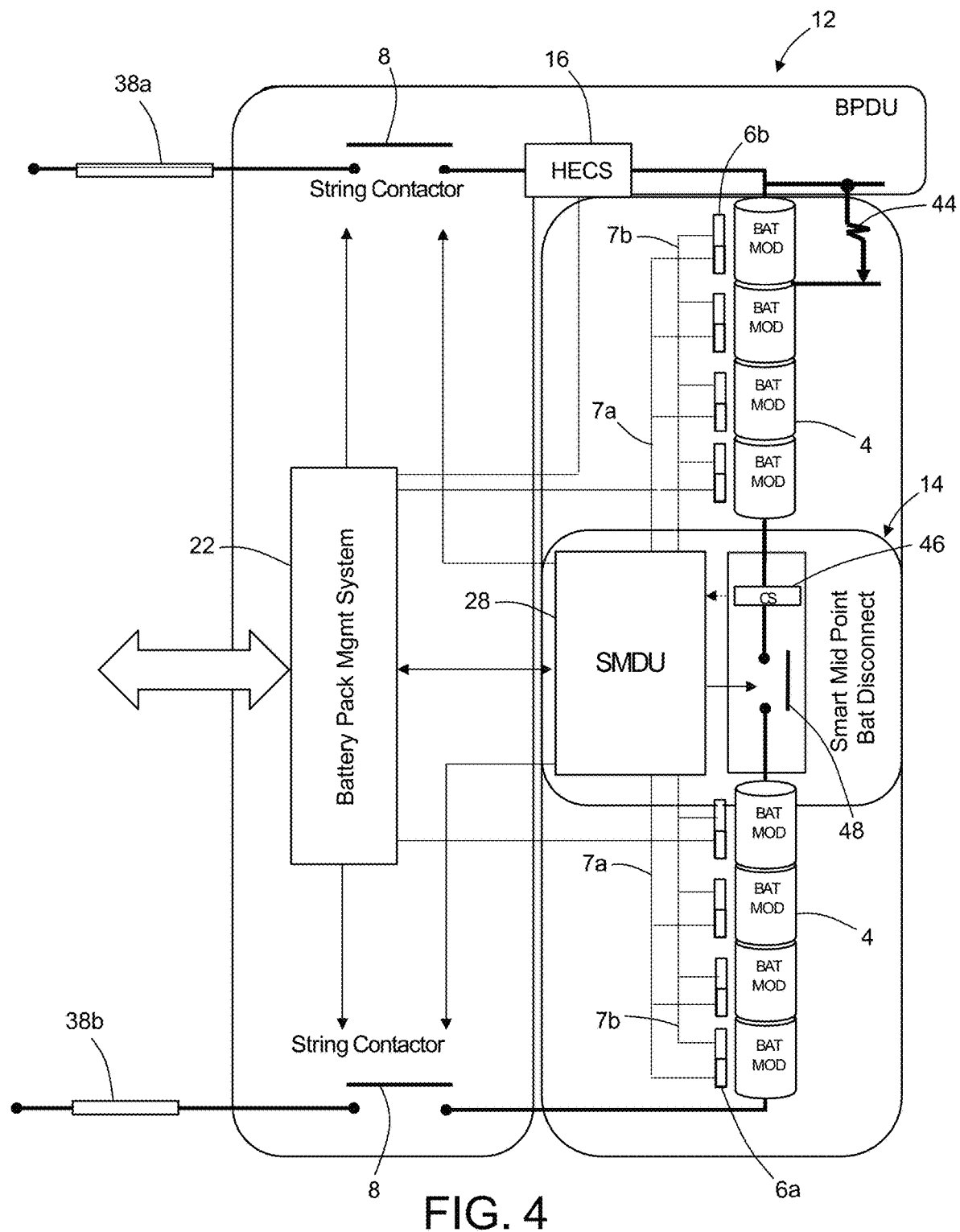
FIG. 4 shows the components depicted in FIG. 3 in the case wherein a battery module has a short circuit across multiple virtual cells.

FIG. 4 shows the components depicted in FIG. 3 in the case wherein a battery module 4 has an external short circuit 44 across its anode and cathode.

Figure 5:
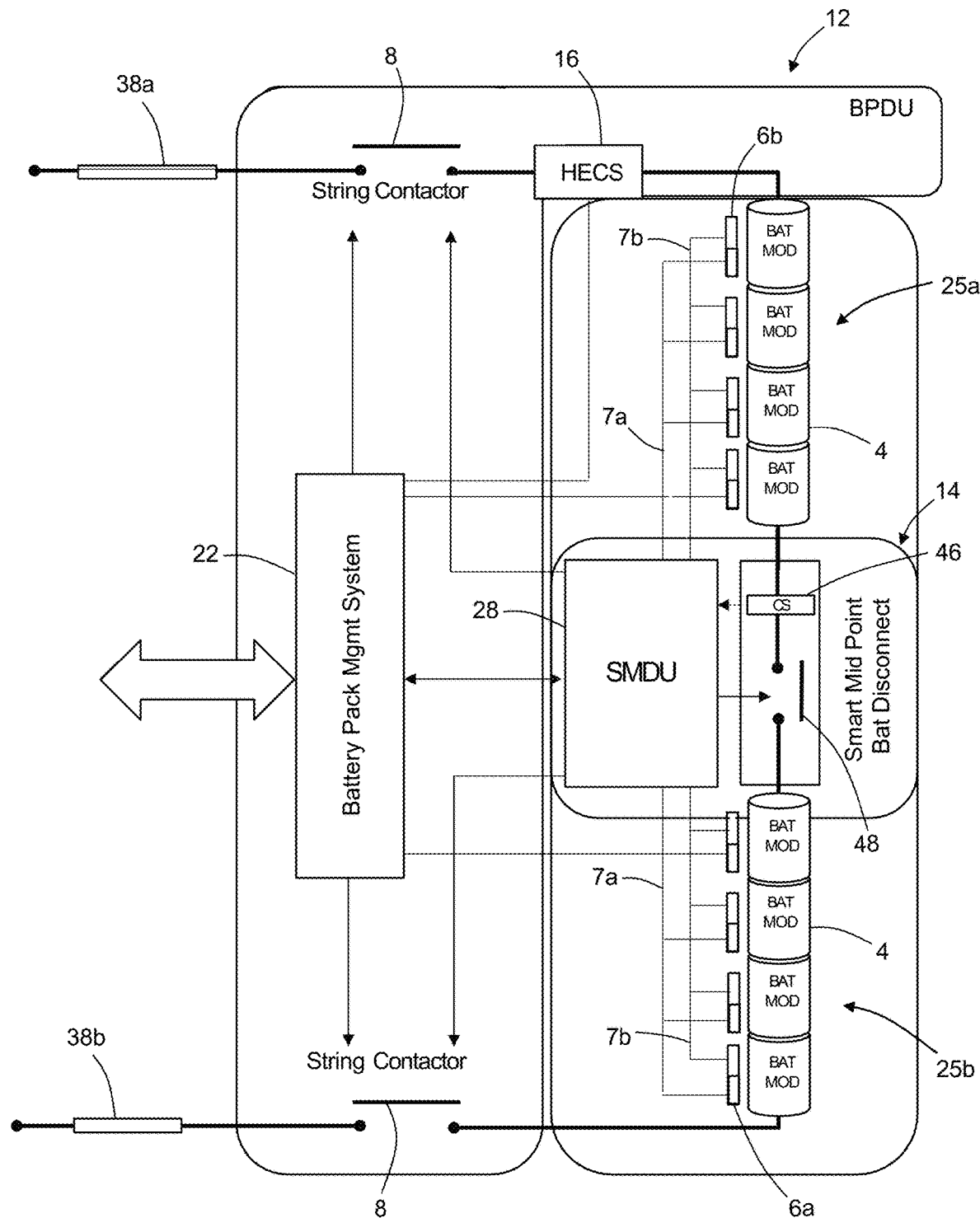
FIG. 5 a diagram representing the same components depicted in FIGS. 3 and 4, but in this instance a short circuit is not indicated.

FIG. 5 is a diagram representing the same components depicted in FIGS. 3 and 4, but in this instance a short circuit is not indicated. Each battery string 24 has a respective dedicated SMDU 28. The purpose of SMDU 28 is to ensure autonomous safe operation of each battery string 24. The SMDU 28 includes a smart controller/disconnect system for implementing battery and electrical protection/isolation of the battery string in case of failure. The mid-point battery disconnect subsystem 14 further includes a mid-point current sensor 46 that outputs an electrical signal to SMDU 28 representing the current flowing through the first and second half-strings 25a and 25b of series-connected battery modules 4 which make up the battery string 24. The mid-point battery disconnect subsystem 14 further includes a mid-point disconnect contactor 48 disposed between the mid-point current sensor 46 and half-string 25b. In accordance with the embodiment depicted in FIG. 5, the SMDU 28 is configured to perform a battery string protection function that opens mid-point disconnect contactor 48 in case of failure when indicated by the current flowing through mid-point current sensor 46.

The SMDU 28 is measuring current with its integrated current sensors (e.g., Hall effect or shunt type current sensors) in series with the mid-point disconnect contactor 48 as seen in FIG. 5. In case of failure, the SMDU 28 will actuate open the mid-point disconnect contactor 48 and isolate the battery string 24. Sequentially after opening of the mid-point disconnect contactor 48, SMDU 28 will open the dedicated string contactor 8 to provide galvanic isolation.

Figure 4A:
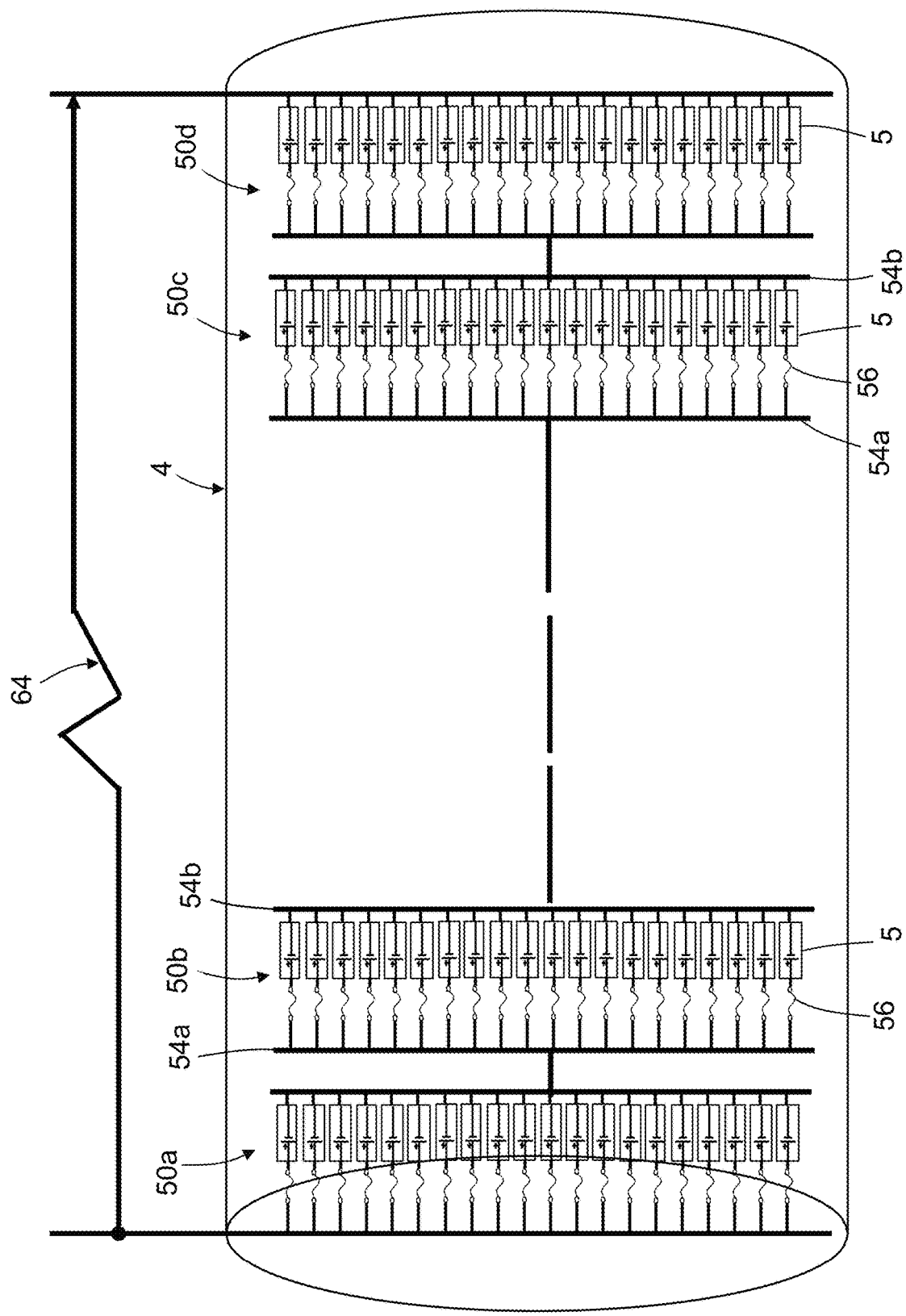
FIG. 4A is a diagram representing internal components of the short-circuited battery module depicted in FIG. 4.

Each battery module 4 includes basic protections to ensure safe standalone operation. In case of individual cell short circuit failure, the fusible link 56 in series with the failed cell 5 will see the current of all the parallel cells 5 and open due to overcurrent. The failed cell 5 will be isolated and the battery module 4 will remain operational with reduced capability. There is no arcing due to the low voltage across a single fusible link 56 (e.g., <5 $V_{DC}$). In case of battery module internal short circuit (shown in FIG. 4A), the combined fusible links 56 of one virtual cell 50 will open due to the overcurrent and isolate the battery module 4. Thus, the battery module 4 will be open circuit and non-operational. The module design (number of series cell, fusible link sizing, etc.) enables a state wherein if the fusible link 56 is opened, the voltage across the fusible link 56 (at the considered altitude) will be lower than an acceptable threshold and not create any sustained arcing. For example, there is no arcing due to the low voltage across all fusible links 56 of a virtual cell (e.g., <100 $V_{DC}$). Cell fusible links 56 are a protection feature only for internal battery module failure (cell short circuit or virtual cell short circuit). When installed in a string, the combined or individual fusible links of a virtual cell should not be open for an external short circuit. The opening of a fusible link (particularly for a complete virtual cell) in case of module external fault could create significant continuous arcing with high energy in close proximity to the cell.

Figure 6:
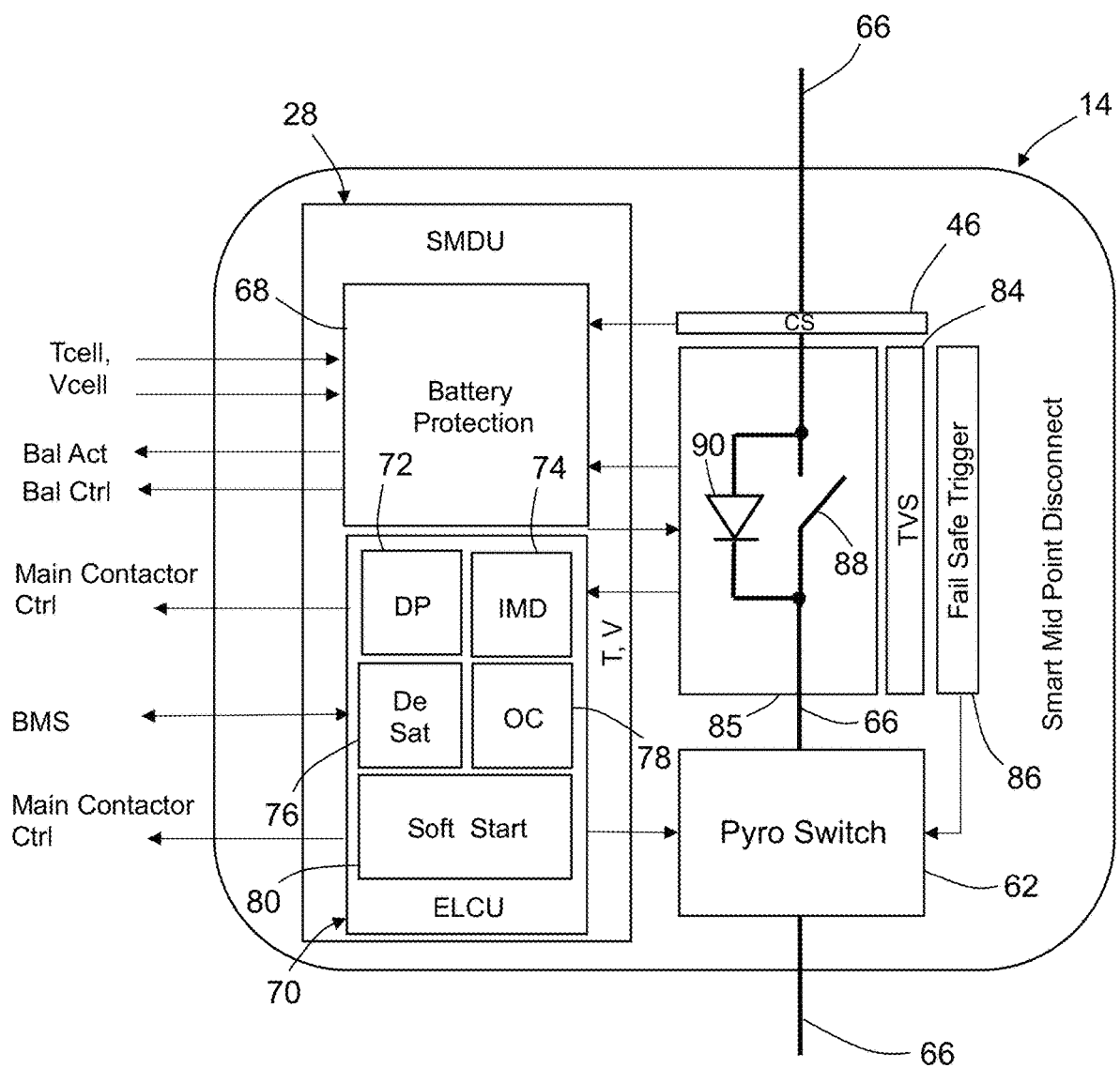
FIG. 6 is a diagram representing a mid-point battery disconnect subsystem having a mid-point semiconductor switch in series with a pyro fuse in accordance with an alternative embodiment.

FIG. 6 is a diagram representing a mid-point battery disconnect subsystem 14 in accordance with an alternative embodiment that includes a mid-point disconnect circuit 85 instead of a mid-point disconnect contactor. The mid-point disconnect circuit 85 includes a Metal-Oxide-Semiconductor Field-Effect Transistor (MOSFET) 88 (or other suitable semiconductor switch) and a diode 90 connected in parallel. A solid-state device may be used for battery packs of large size in which nominal voltage and current can be higher than levels which a contactor can tolerate. The SMDU 28 shown in FIG. 6 is configured to perform a battery string protection function that opens MOSFET 88 in case of failure.

In the example embodiment depicted in FIG. 6, the mid-point battery disconnect subsystem 14 further includes a pyro switch 62 (or other fail-safe device) in series with the mid-point disconnect circuit 85. The pyro switch 62 may be triggered by a fail-safe trigger circuit 86. The mid-point battery disconnect subsystem 14 depicted in FIG. 6 further includes a transient voltage suppression device 84 (hereinafter "TVS device 84"), such as a transorb, Zener diode, varistor, etc., which is connected in parallel with the mid-point disconnect circuit 85. The TVS device 84 is configured to direct unwanted energy away from the mid-point disconnect circuit 85. For example, a transient voltage suppression diode (commonly known as a "transorb") is an electronic component used to protect sensitive electronics from voltage spikes induced by another source. A transorb will shunt excessive current when the voltage across the transorb exceeds a certain level.

FIG. 6 shows the architecture of SMDU 28 in accordance with one embodiment. The SMDU 28 includes a battery protection module 68, which performs the battery string protection function (described above), and an electrical load control unit 70 (hereinafter "ELCU 70"), which performs the string electrical protection function (described above).

The ELCU 70 is a processing unit (e.g., a microprocessor) with the overarching control function. It receives information from various lower-level controllers, including: differential protection module 72, insulation monitoring device 74, desaturation protection module 76, over-current protection module 78, and soft start control module 80. Based on the information received from the lower-level controllers, the ELCU 70 implements coordination with other elements of the electric system, including pyro switch 62, MOSFET 88, and string contactors 8. For example, the ELCU 70 commands MOSFET 88 and string contactors 8 to open. In the following discussion, the mid-point disconnect circuit 85, mid-point current sensor 46, TVS device 84, differential protection module 72, insulation monitoring device 74, desaturation protection module 76, and over-current protection module 78 will be collectively referred to as the solid-state power controller (hereinafter "SSPC 81"). The pyro switch 62 is not part of the SSPC. Likewise the soft start control module 80 (indicated by "CTRL" in FIG. 14) is not part of the SSPC 81 (seen in FIG. 14). The IMD 26, desaturation protection module 76, and over-current protection module 78 are the controlling functions, which are physically implemented in the ELCU microprocessor, i.e., physically they are in the same chip with ELCU 70. The ELCU 70 also has additional control functions such as main contractor control and coordination with BPMS 22. While implemented in the ELCU 70, these control functions "talk" to the SSPC 81 and the pyro switch 62 in a coordinated manner which is defined in the ELCU 70.

The SMDU disconnect circuit architecture depicted in FIG. 6 is based on a "fail-safe" unidirectional SSPC implementation. The SSPC implementation enables fast fault isolation (in microseconds) without electrical arcing and without using large/heavy high-voltage electromechanical devices and/or fuses. SMDU SSPC current is measured with integrated current measurement (shunt-type or Hall effect current sensors). The drain-to-source voltage $V_{ds}$ across the solid-state switch (e.g., MOSFET 88) is also used for protection purposes as an image of the switch current.

Figure 7:
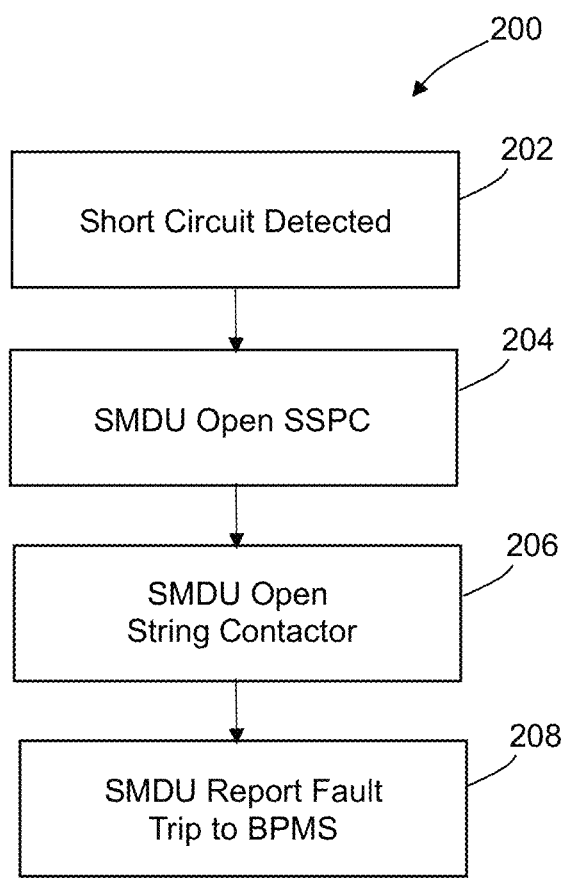
FIG. 7 is a flowchart identifying steps of a method for protecting a battery string in response to a short circuit in accordance with one embodiment.

FIG. 7 is a flowchart identifying steps of a method 200 for protecting a battery string in response to a short circuit in accordance with one embodiment. First, a short circuit is detected (step 202). In response to detection of the short circuit, the SMDU 28 opens the SSPC (step 204). (As used herein, the phrase "open the SSPC" means open a switch or contactor incorporated in the mid-point disconnect circuit.) After opening the SSPC, the SMDU 28 opens (trips) the string contactor 8 (step 206). In case of string protection trip, SMDU 28 will report the trip type to BPMS 22 (step 208). The BPMS 22 will reset protection depending on all the trip types reported by the different strings.

The SMDU disconnect architecture is selected as unidirectional SSPC in order to minimize the losses during the normal mode as compared to a bidirectional switch. The tradeoff is that the unidirectional switch is only able to block current in one direction. The SSPC is designed to block and interrupt the current only in the discharge mode. In the charge mode, the SSPC is not able to block the current since the current can still flow through diode 90. The unidirectional design rationale is that high current/fast breaking capability is only required during the discharge mode to protect against the uncontrolled battery high short-circuit current capability. In the charge mode, the string contactors 8 for a single string are able to interrupt the battery charger current (controlled current limited power supply 50-100 $A_{dc}$, for example) under normal operating mode delta voltage ($V_{charger}$-$V_{battery}$). If a short occurs across or inside a string during the charging mode, the unaffected strings automatically enter the discharging mode (they feed the fault) and the Hall effect current sensor of the affected string detects excessive current and then reports the condition to the SMDU 28 and BPMS 22. The unaffected strings are then protected by their SSPCs as described in the immediately preceding paragraph (with the option after the fault is cleared to re-engage contactors of these strings). After this, the string contactors 8 in the affected string are commanded to open, thereby interrupting the current from the charger if the charger did not trip.

The fault in the affected string shall be isolated. There are two types of faults possible: one on either half of the string (downstream from the SSPC to either the positive or negative rail, such that the short-circuit current does not flow through the load current sensor 92). In this case the fault is undetected by the load current sensor and the only means of protection are the fusible links (passive protection). If a fault occurs between the positive and negative rails internal to the string, the short-circuit current flows through the load current sensor 92, is detected, and therefore shall be cleared by the steps already described in the disclosure.

The string contactors 8 are used to provide galvanic isolation for the positive and negative high-voltage busbars 38a and 38b required for each battery string 24. The SMDU solid-state disconnect circuit is always open prior to opening of the string contactor 8 during the discharge mode when a fault is to be cleared. In that case the string contactor 8 can be sized to not break significant current/voltage and only interrupt current such as charge current with moderate voltage breaking. Advantageously, implementation with "open air" non-hermetic-type contactors can be used for BDU implementation. The string contactors 8 can be optimized for low weight and high reliability in this architecture by removing the constraint of high current/high voltage breaking. As described later on, the pyro-switch/fuse can be used as a disconnect back up to provide an additional battery overcharge shutdown mechanism.

Using the SSPC high opening speed, specific electrical protection can be implemented to minimize short-circuit incidental energy, such as desaturation switch protection. Desaturation protection is measuring the voltage across the semiconductor switch $V_{ds}$ to determine whether a transistor (e.g., a MOSFET) is operating in a fully turned-on condition. If the transistor is only partially turned on or in a desaturation condition, there is the possibility for the device to overheat and self-destruct.

Figure 8A:
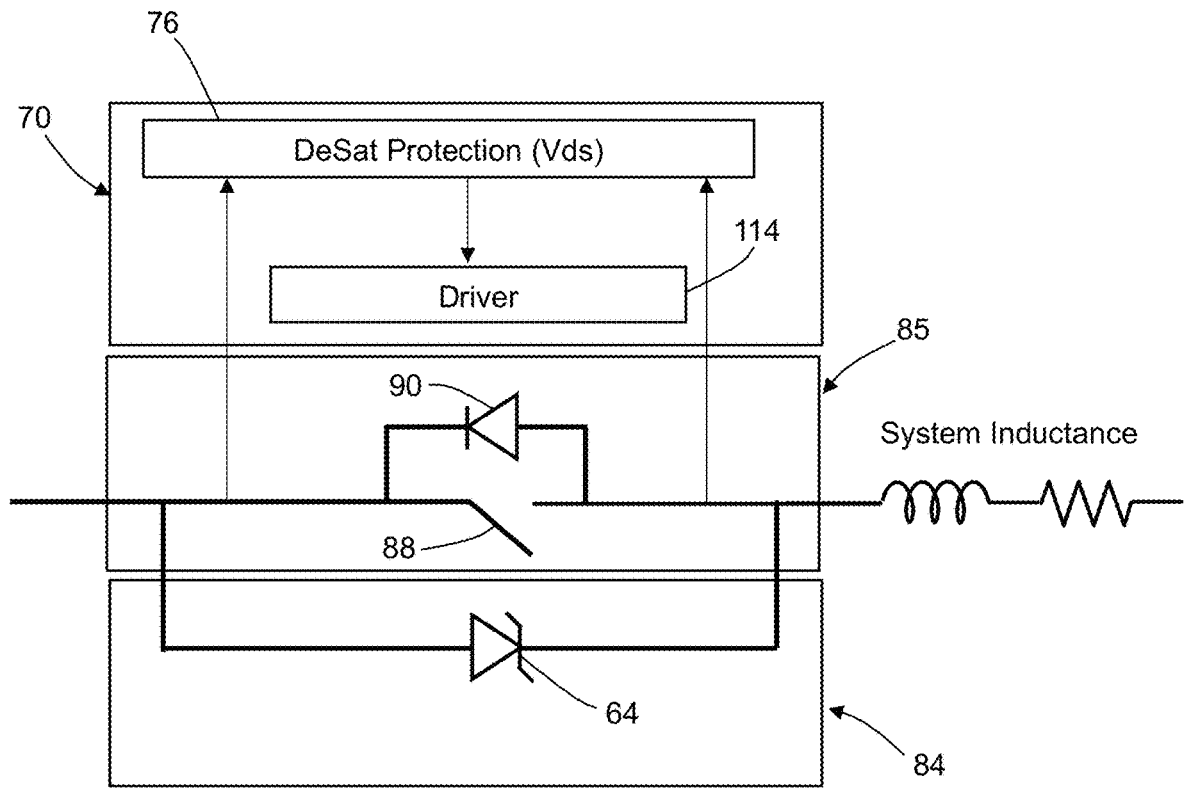
FIG. 8A is a circuit diagram showing some components of a smart mid-point battery disconnect subsystem that includes a transient voltage suppression device, a mid-point disconnect circuit, and a desaturation protection module in accordance with one proposed implementation.
Figure 8B:
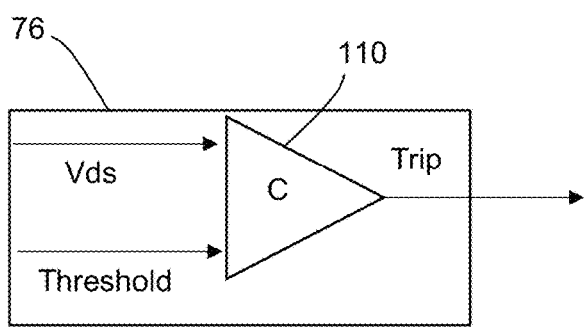
FIG. 8B is a diagram showing one component of a desaturation protection module in accordance with one proposed implementation.

FIG. 8A is a circuit diagram showing some components of a smart mid-point battery disconnect subsystem 14 in accordance with one proposed implementation that includes a TVS device 84, a mid-point disconnect circuit 85, and a desaturation protection module 76. The mid-point disconnect circuit 85 includes a MOSFET 88 and a diode 90 connected in parallel. The TVS device 84 comprises a Zener diode 64. The smart mid-point battery disconnect subsystem 14 further includes a driver 114 that is activated by the desaturation protection module 76 for driving MOSFET 88 to open when the drain-to-source voltage $V_{ds}$ across MOSFET 88 exceeds a threshold. The desaturation protection module 76 is measuring $V_{ds}$ across MOSFET 88 and opening it directly through control of driver 114. As shown in FIG. 8B, the desaturation protection module 76 comprises a comparator 110 that outputs a trip signal in response to the voltage $V_{ds}$ exceeding a threshold.

Figure 9A:
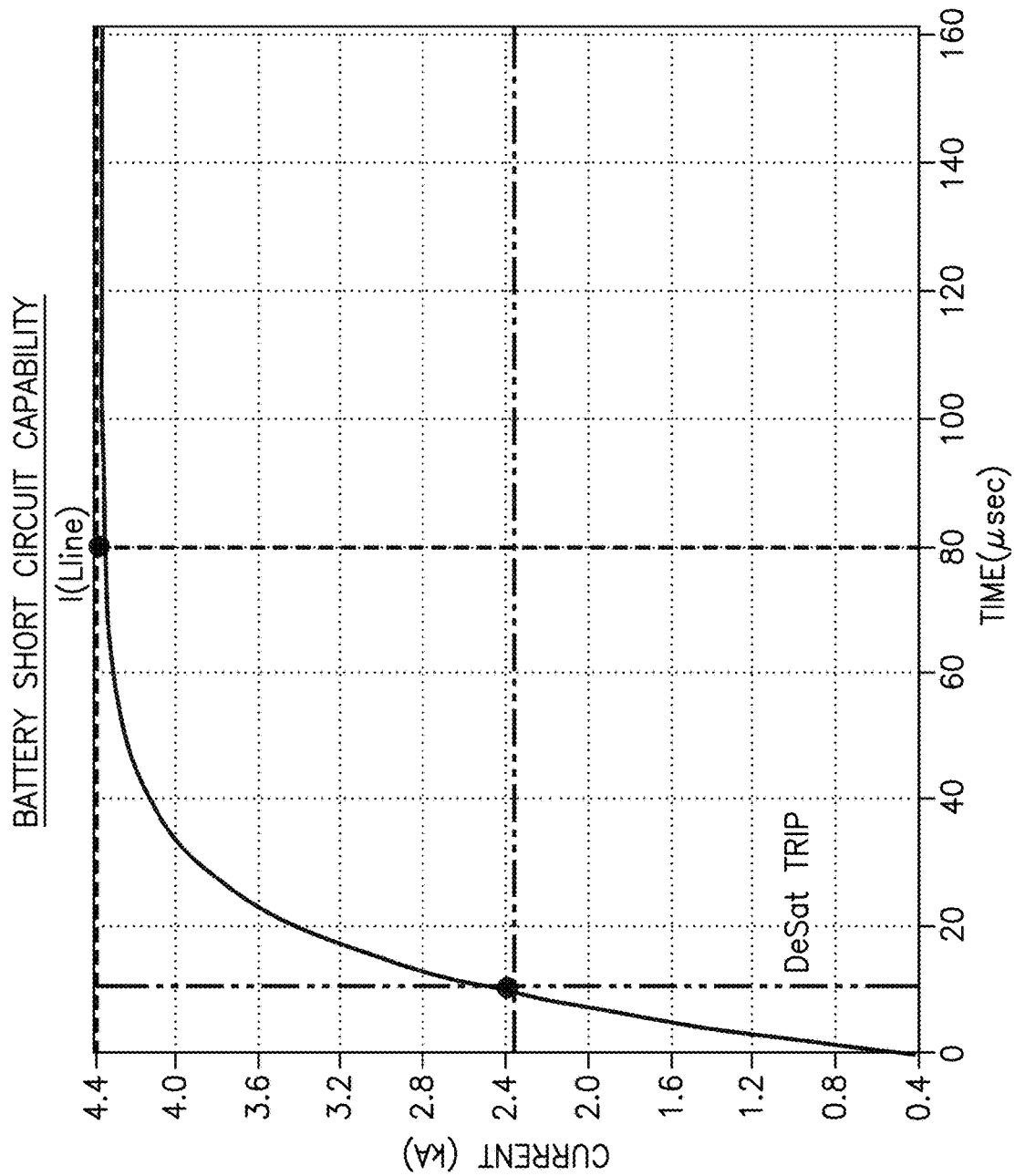
FIG. 9A is a graph showing the short-circuit current across a semiconductor switch versus time calculated for a model battery following the occurrence of a short circuit at time t=0.
Figure 9B:
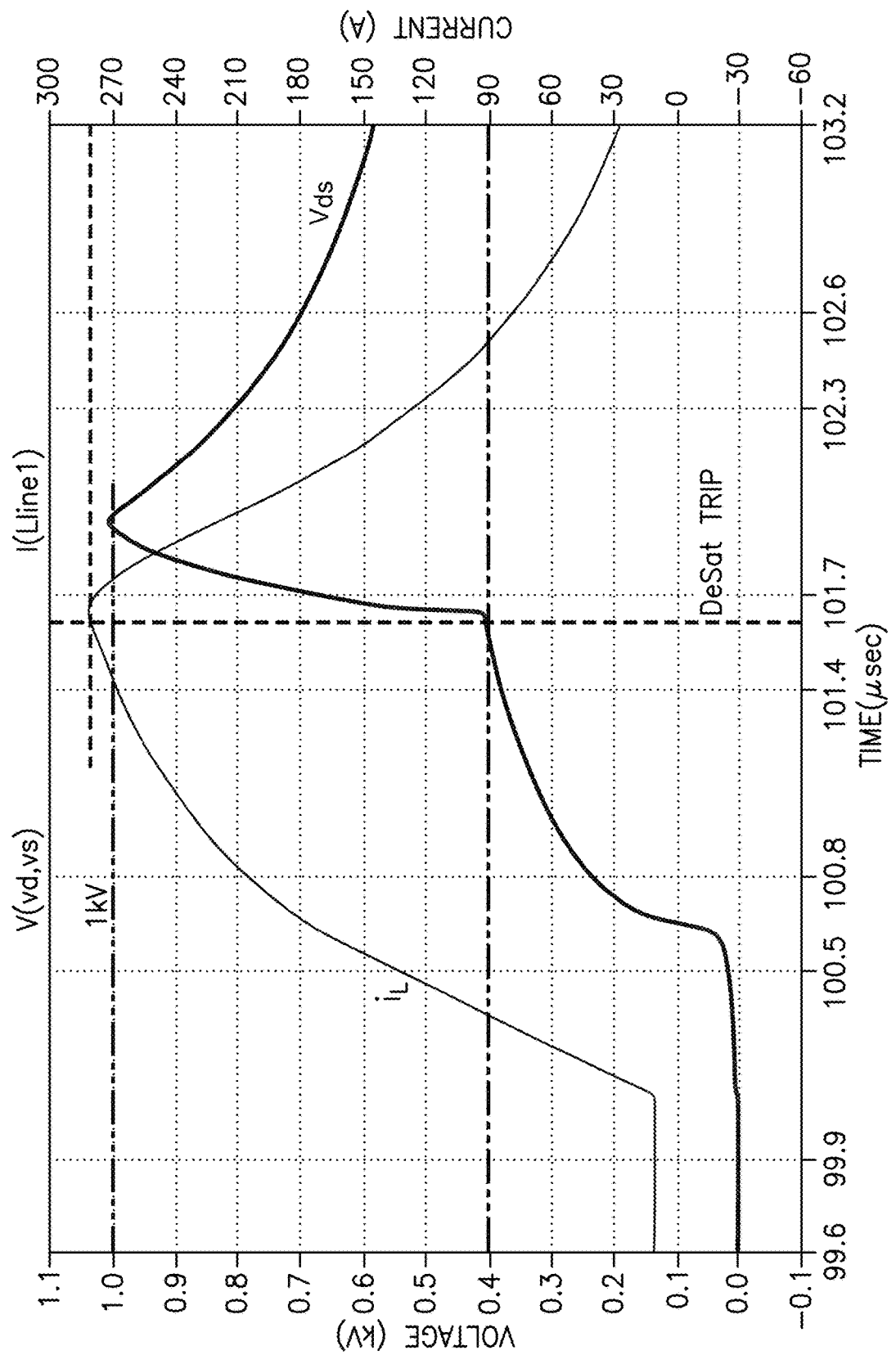
FIG. 9B is a graph showing the voltage and current across a semiconductor switch following a short circuit for a simulated mid-point battery disconnect subsystem having desaturation protection and transient voltage suppression.

With analog or digital hardware (e.g., FPGA) control implementation, desaturation protection is capable to trip in less than 10 μsec for a hard short-circuit fault. Taking into account the system impedance (inductance), desaturation protection can isolate the fault before the battery's maximum short-circuit current capability is reached. For example, FIG. 9A is a graph showing the short-circuit current versus time calculated for a model battery following the occurrence of a short circuit at time t=0. A trip signal produced at time t=10 μsec would limit the short-circuit current to 2.4 $kA_{DC}$ instead of reaching a maximum short-circuit current of 4.4 $kA_{DC}$ steady state. At opening, over-voltage due to system inductance needs to be clamped by the TVS device 84. The TVS device 84, which is parallel with mid-point disconnect circuit 85, will clamp the over-voltage across the MOSFET 88 during the fast opening created by the overall system inductance and opening dynamic. In the simulation results shown in FIG. 9B, the desaturation protection trip occurred in less than 2 μsec when the drain-to-source voltage $V_{ds}$=400 $V_{DC}$ and the current $I_{ds}$=280 $I_{DC}$. The over-voltage at opening $V_{ds}$ was clamped at ~1000 $V_{DC}$ by the TVS device 84.

The desaturation protection needs to be blocked during start up. To detect whether a load fault exists during start up, the output voltage is detected. If the output voltage increases normally, the load can be assumed to be normal.

Figure 10:
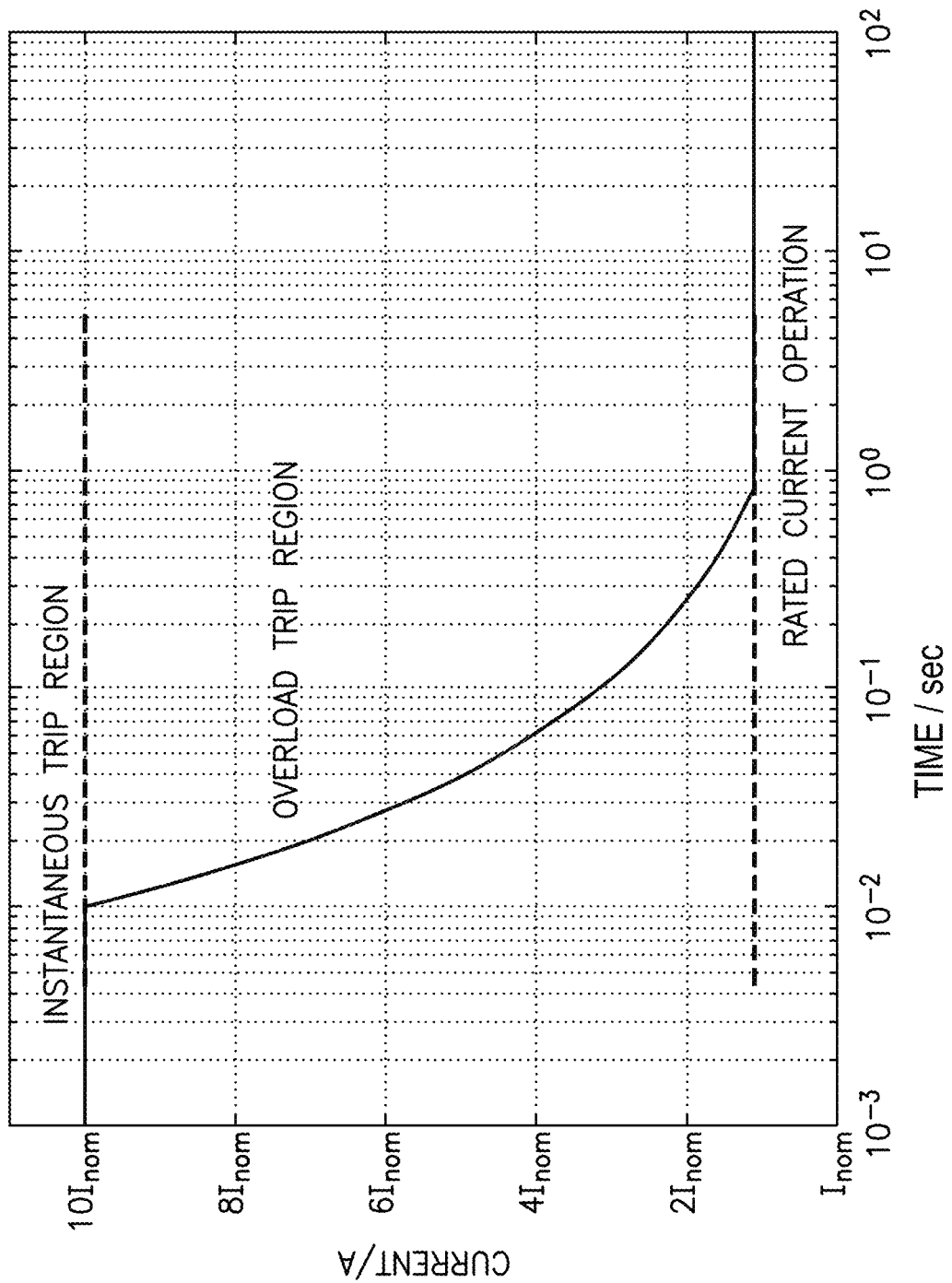
FIG. 10 is a graph showing the current across a semiconductor switch versus time following a short circuit for a simulated mid-point battery disconnect subsystem having over-current protection.

Referring again to FIG. 6, the over-current protection module 78 is configured to provide over-current protection using a standard time-current curve that shows how fast a contactor or SSPC will trip at any magnitude of current. FIG. 10 is a graph showing one example of current flowing through the semiconductor switch over time following a short circuit for a simulated mid-point battery disconnect subsystem having over-current protection. The numbers along the abscissa (horizontal) axis of the curve shown in FIG. 10 represent time in seconds. The over-current protection module 78 implements instant trip protection to protect the solid-state switch and the electrical system (battery, wire, etc.) in case of significant overcurrent.

In addition, the string differential protection module 72 seen in FIG. 6 uses mid-point current measurement data acquired by a mid-point current sensor 46 and current measurement data acquired by an end-point current sensor 16 of the battery power distribution unit 12. The ELCU 70 computes the differential current for the battery string 24 and compares that differential current to a differential current threshold $I_{dp}$.

In accordance with one proposed implementation, the SDMU 28 is configured to implement differential current string protection using the end-point current sensor 16 at the positive side and the mid-point current sensor 46. For each battery string 24, if the midpoint current is not equal to the current detected by the end-point current sensor 16 at the positive side, string differential protection is activated and the battery string is isolated by opening the string contactors 8. The differential protection trip time is coordinated with over-current to sense negative/positive current difference when Hall effect current sensors are utilized.

One critical issue with using solid-state switches for protective disconnect implementation is the potential "fail shorted" failure mode. A solid-state switch can fail short due, for example, to the avalanche effect or critical energy switch thermal runaway. In that condition, the solid-state switch is not capable to clear the fault and isolate the battery string. Typically, the switch will keep conducting until significant damage is inflicted to its packaging. Internal wire-bond chip connection may finally open/lift off. However, with high voltage and high operating altitude, sustained arcing could happen across the blown wire bond and lead to further damage and current still flowing into the fault.

In accordance with the embodiment depicted in FIG. 6, a fail-safe device is implemented in series with the solid-state switch to provide redundancy. The fail-safe device is a pyro-switch element trigger using an independent "fail-safe" protection. The voltage across the solid-state switch $V_{ds}$ is independently sensed and used directly to trigger and initiate a pyro switch 62. A timer is used to delay the ignition to enable the primary desaturation protection to open the SSPC before activating the pyro switch 62. If the SSPC is shorted, the pyro switch 62 is directly autonomously ignited and will isolate the circuit. The fail-safe pyro switch 62 is fully independent and does not need an auxiliary power supply to operate. The complete circuit is powered and activated using the drain-to-source voltage $V_{ds}$ of the solid-state switch. The pyro switch 62 acts as and emulates a traditional passive fuse. Fast trip time can be achieved using the pyro switch 62 (<1 msec), thereby enabling to limit the incidental energy and potential damage.

When the pyro switch 62 is commanded to open (essentially a "guillotine" cuts through a thin copper plate), there is a potential risk of sustained arcing. To mitigate this issue, as soon as the command is sent to break the current-carrying copper plate inside the pyro switch 62, a small diode/MOSFET auxiliary circuit (connected in parallel with the copper plate) is commanded to close and a large portion of the short-circuit current will flow through this auxiliary circuit in parallel with the current flowing through the arc. The voltage drop across the arc can be 20 V and higher, while the voltage drop across the MOSFET is 0.7 V. Therefore, the short-circuit current would largely be routed into the parallel path which is normally the open circuit. As a result, the arc inside the pyro switch 62 is extinguished. Now, the short-circuit current bypasses the main current path and is routed through a high-voltage fuse with a very small current rating (e.g., several amps) so that it shall not blow before the MOSFET saturates. After a very short time, the fuse blows open, but since it is a high-voltage fuse, the arc is not sustained. So the fault is now interrupted and no arc is sustained.

Figure 11:
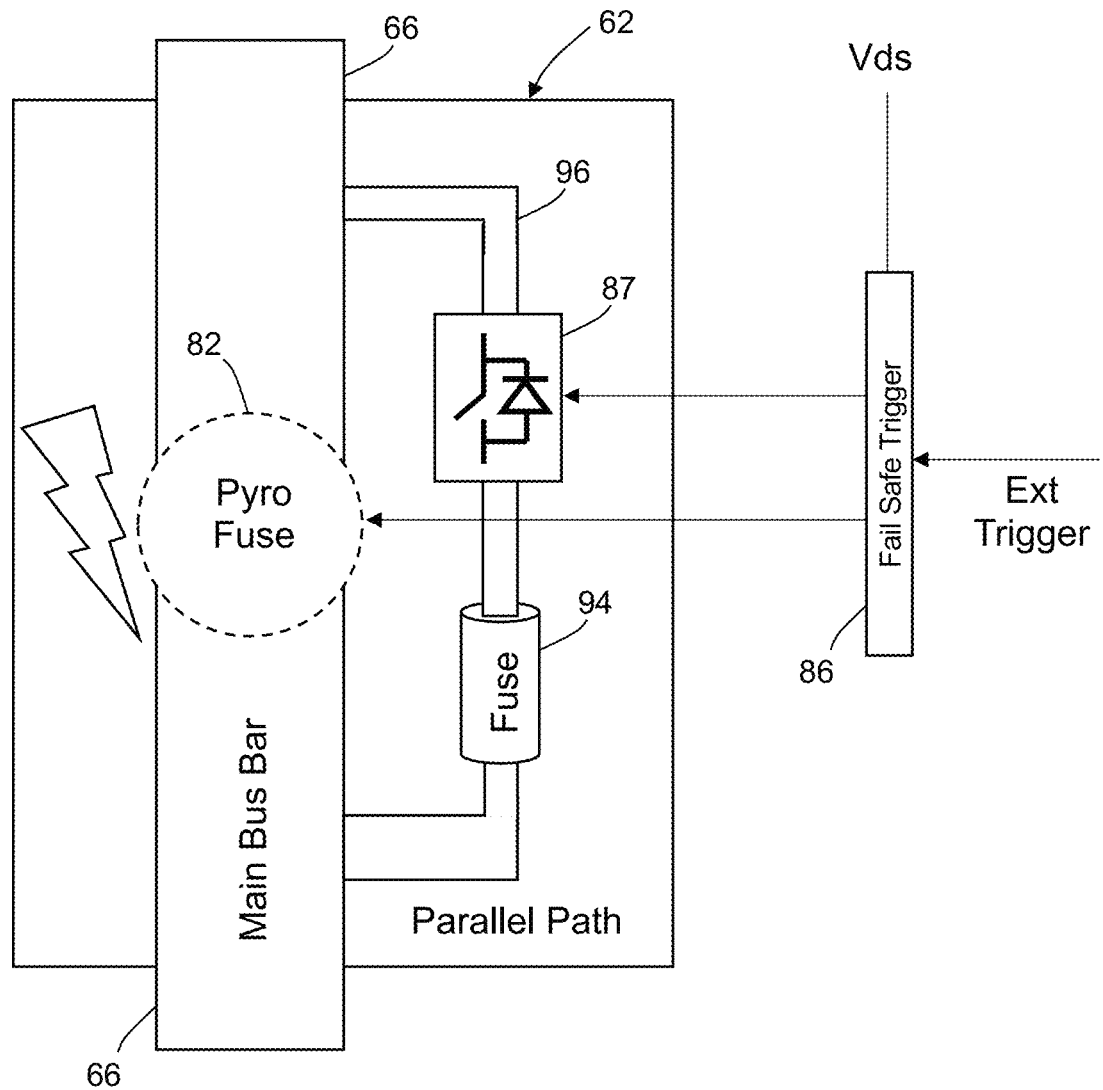
FIG. 11 is a diagram showing a pyro switch arrangement in accordance with one proposed implementation.

FIG. 11 is a diagram showing a pyro switch arrangement in accordance with one proposed implementation. The pyro switch 62 includes a pyro fuse 82 disposed along the main busbar 66. A pyro fuse is a type of fuse for high voltage that uses explosive rather than melting metal bar to prevent arcing by disconnecting contacts faster. The pyro switch 62 also includes a small lightweight low-current (5 $A_{DC}$) and high-voltage fuse 94 disposed along a parallel path 96. The parallel path 96 also includes an auxiliary circuit 87 in series with the fuse 94. The auxiliary circuit 87 is similar to the mid-point disconnect circuit 85 (see FIG. 6) and includes a MOSFET in parallel with a diode.

In the discharge mode for short circuit, when the pyro fuse 82 is activated, the current flows through the parallel branch until fuse 94 is blown. The fuse 94 is used to provide the fault clearing capability at high voltage. The small parallel circuit enables to limit the arcing event by blowing the pyro fuse 82 shunted by the parallel circuit and clearing the fault through the fuse 94. Tandem protection can be implemented between the SSPC and pyro switch. The SSPC is used to open in response to a short circuit in its SOA (switching time, maximum current, system inductance) and the pyro switch is covering the zone which is challenging for the semiconductor to clear the fault (over-voltage). In that case, an external trigger is used to initiate the pyro fuse 82.

In the charge mode, the pyro fuse 82 can be triggered by the same external signal. With the pyro fuse 82 opened, the charging current could still flow though the parallel path 96 and keep charging the battery. The fuse 94 may not blow if the charging current is below or close to its rating (5 $A_{DC}$ for ex). To provide full redundancy in the charge mode to the string contactor, the pyro switch element is designed to be able to open and block with zero net current during charge. The parallel path 96 is using a diode/MOSFET circuit to block the parallel path 96 during charge mode. It is important to note that during charge mode, the pyro fuse 82 can be blown without shunting since the mid-point voltage difference is approximately zero and no arc will be created. The pyro fuse 82 can be embedded in a high-current PCB trace with a separated small parallel PCB trace with fuse 94 and auxiliary circuit 87. Both diode/MOSFET circuits (mid-point disconnect circuit 85 seen in FIG. 6 and auxiliary circuit 87 seen in FIG. 14) may have TVS as a part of their protection against over-voltages.

The pyro fuse 82 can be triggered (during charge (over-charge)/discharge mode (over-discharge)) by an external signal (from ELCU 70 or BPMS 22). For those conditions, the parallel path 96 can be blocked if required in both directions. If bidirectional blocking is required, a back-to-back switch will be implemented in the parallel path.

As previously mentioned with reference to FIG. 6, the SMDU 28 also includes a soft start control module 80. In normal mode, SMDU 28 is capable to pre-charge the high-voltage capacitive bus by actively controlling the semiconductor switch in linear mode. The soft start algorithm is configured to detect the voltage across the semiconductor device and control the current flowing through the semiconductor device to be maximum power ($P_{max}$)/drain-to-source voltage ($V_{ds}$) by adjusting the gate drive voltage. The maximum power $P_{max}$ is determined by the switch safe operating area (SOA) with proper coordination with the desaturation protection.

Usually, DC power from a battery "enters" a motor controller (a primary type of load) right where a relatively large DC capacitor is installed between high-voltage (+ and −) busbars. The source "sees" this as a capacitive load with extremely low resistance for the transient period of time needed to charge the capacitor. This process of charging is accompanied by a very large current supplied by a source (due to low resistance for the time while the capacitor is being charged). When the capacitor is fully charged, the current drops to the nominal or below level and the load is energized and ready for operations. This is the reason that the MOSFET 88 is operated in the linear region, i.e., limiting its voltage output and therefore limiting the amount of capacitor's charging current. This is an initial step to prepare a motor controller to operate a motor. In the electric power industry, this operation is called "soft starting", i.e., delaying applying the full voltage in one step, but gradually increasing it over a certain period of time. For high voltages, this time would be several seconds to get safely to 1000 V, for example.

Implementing a soft-start routine eliminates the problems caused by inrush current, as it allows the current to build up over a controlled period of time to the required value. Inrush current is the instantaneous high input current drawn by a power supply or electrical equipment at turn-on. This arises due to the high initial currents required to charge the capacitors and inductors or transformers. There are two major elements to the operation of the soft-start routine: (1) the soft-start routine prevents the output voltage from overshooting, or severely reduces the scale of the overshoot, by ensuring that the output voltage does not rise too fast; and (2) the soft-start routine reduces the large voltage drop experienced when a partially discharged battery releases a large inrush current. The soft-start routine reduces the size of the inrush current, thus also reducing the voltage drop at start-up and enabling the system to maintain voltage above the threshold for triggering the systems under-voltage lockout (IVLO) mechanism.

Figure 12:
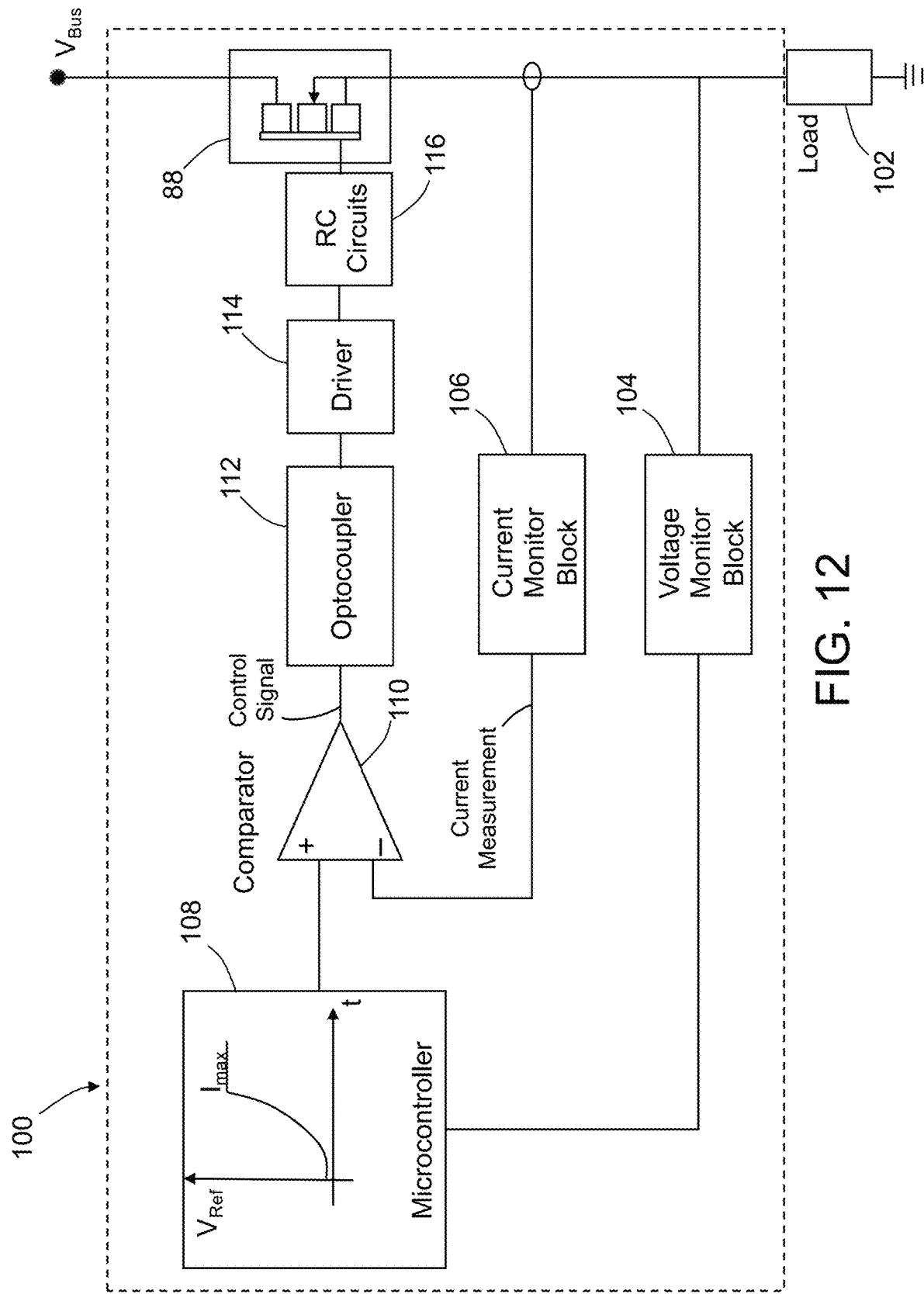
FIG. 12 is a flowchart showing a soft start control strategy for optimizing the trajectory of current passing through the mid-point semiconductor switch depicted in FIG. 6 in order to pre-charge the high-voltage capacitive bus.

FIG. 12 is a flowchart showing a soft start control algorithm for optimizing the trajectory of current passing through the mid-point semiconductor switch (MOSFET 88) in order to pre-charge the high-voltage capacitive busbar. The MOSFET 88 is connected to a load device 102. The microcontroller 108 of the ELCU 70 receives electrical signals representing the output voltage from a voltage monitoring block 104 and outputs a current threshold retrieved from a look-up table. A comparator 110 receives electrical signals representing the current on the source side of the MOSFET 88 from a current monitoring block 106 and compares that current to the current threshold. The comparator 110 outputs a control signal to a driver 114 when the measured current exceeds the current threshold. The driver 114 controls a gate drive voltage of the MOSFET 88 by applying a pulsewidth-modulated (PWM) signal that is filtered by a large RC filter 116. The comparator output is transmitted to the driver 114 via an optocoupler 112, which is an electronic component that transfers electrical signals between two isolated circuits using light. The optocoupler 112 prevents high voltages from affecting the driver 114.

Figure 13A:
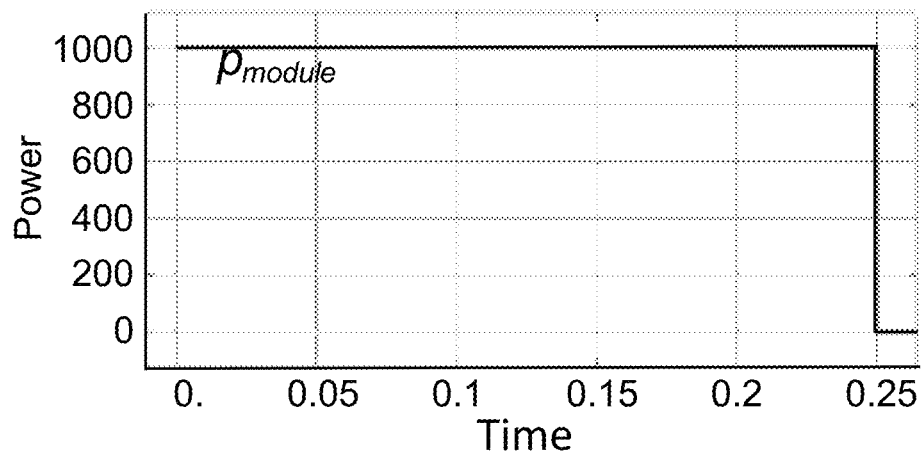
FIGS. 13A-13C are graphs showing power, current, and voltage during pre-charging of the high-voltage capacitive bus using a soft-start routine in accordance with one proposed implementation.
Figure 13B:
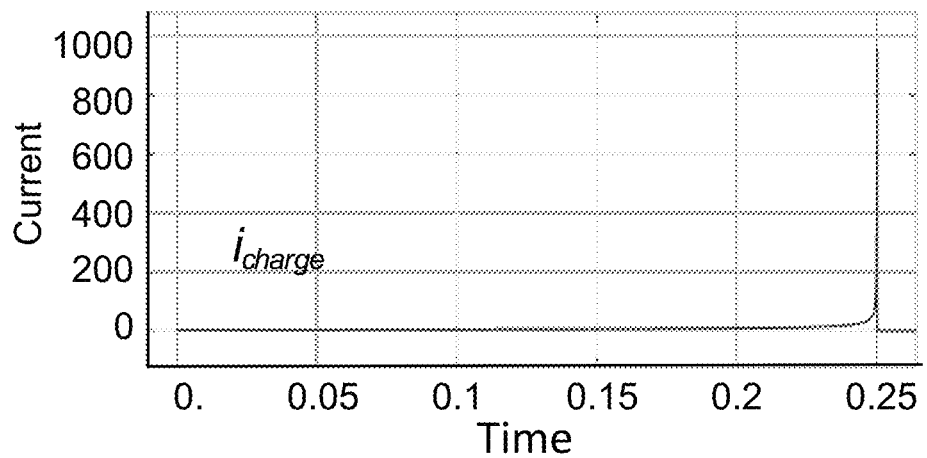
Figure 13C:
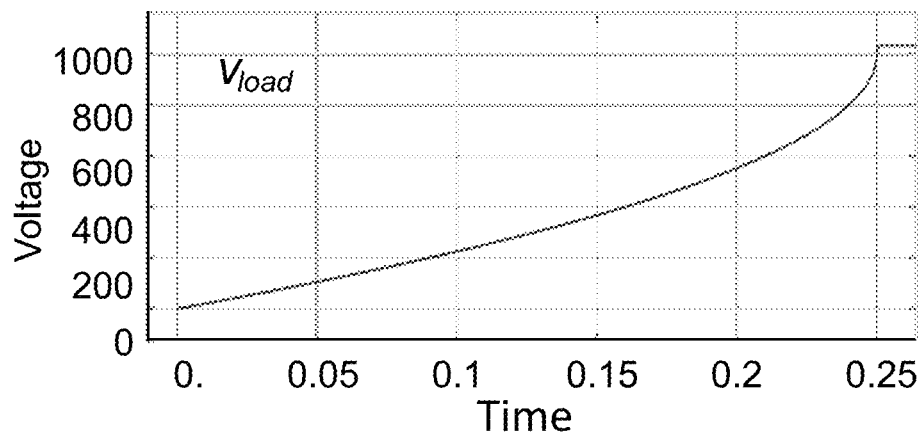

FIGS. 13A-13C are graphs showing power, current, and voltage during pre-charging of the high-voltage capacitive bus using a soft-start routine in accordance with the implementation depicted in FIG. 12. For example, assume that a 1-MW source can provide 1000 A at 1000 V, but one wants to limit the sources output by 1000 W during the time needed to charge a motor controller's capacitor. If a MOSFET 88 is operated in the linear region such that its output current is very low (e.g., several amps or tens of amps), one would apply a very low voltage to the gate and then gradually increase this gate voltage, thereby increasing $V_{ds}$ and letting charging current flow through the MOSFET 88. One would see limited source power (1000 W), relatively stable low current and ramping up $V_{ds}$ voltage (shown in FIG. 13C) until it reaches 1000 V (in 0.25 sec.). The current spike to 1000 A shown in FIG. 13B is associated with the very abrupt step from 900 V to 1000 V seen in FIG. 13C, but the system is designed to support this level of current.

Figure 14:
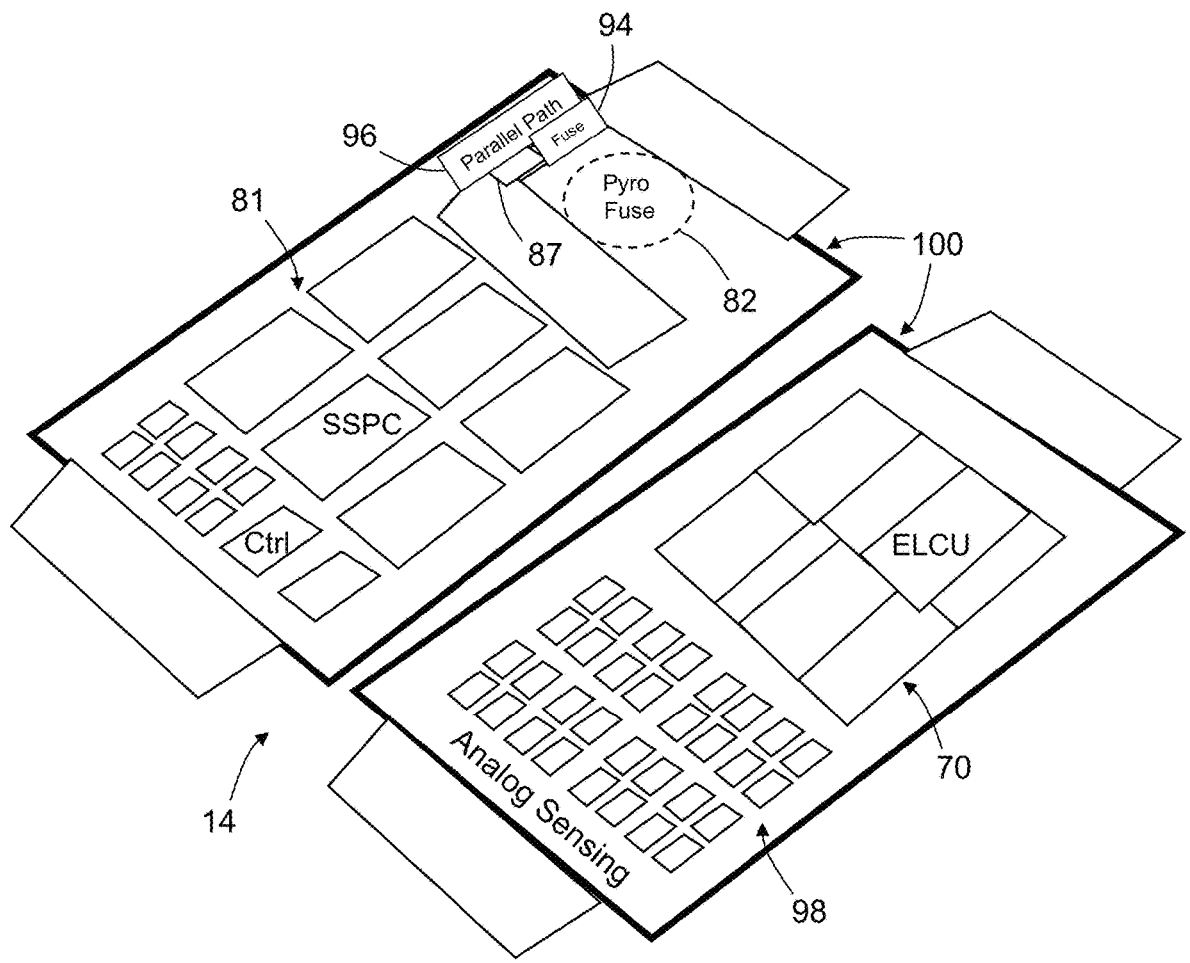
FIG. 14 is a diagram showing one example of a physical implementation of a mid-point battery disconnect subsystem that has been integrated on a printed circuit board (PCB).

FIG. 14 is a diagram showing one example of a physical implementation of a mid-point battery disconnect subsystem 14 that has been integrated on a printed circuit board 100 (hereinafter "PCB 100"). In this example, the ELCU 70 and analog sensing 98 are mounted on one side of PCB 100, while the pyro fuse 82, fuse 94, and SSPC 81 are mounted on the other side of PCB 100. The diagram demonstrates that the functionalities described above can be implemented in hardware and integrated on a PCB in a relatively compact and inexpensive way.

With respect to the circuitry labeled "CTRL" in FIG. 14, overarching control can be implemented in ELCU 70 with multiple sensing and controlling elements (monitoring and processing information about cell voltages and temperatures, states of cell charge, load currents and voltages, desaturation voltage, etc.). Partially, the elements that control SSPC 81 can also control the pyro switch 62 in addition to dedicated control elements like the soft start control module 80 (see FIG. 6).

Figure 15:
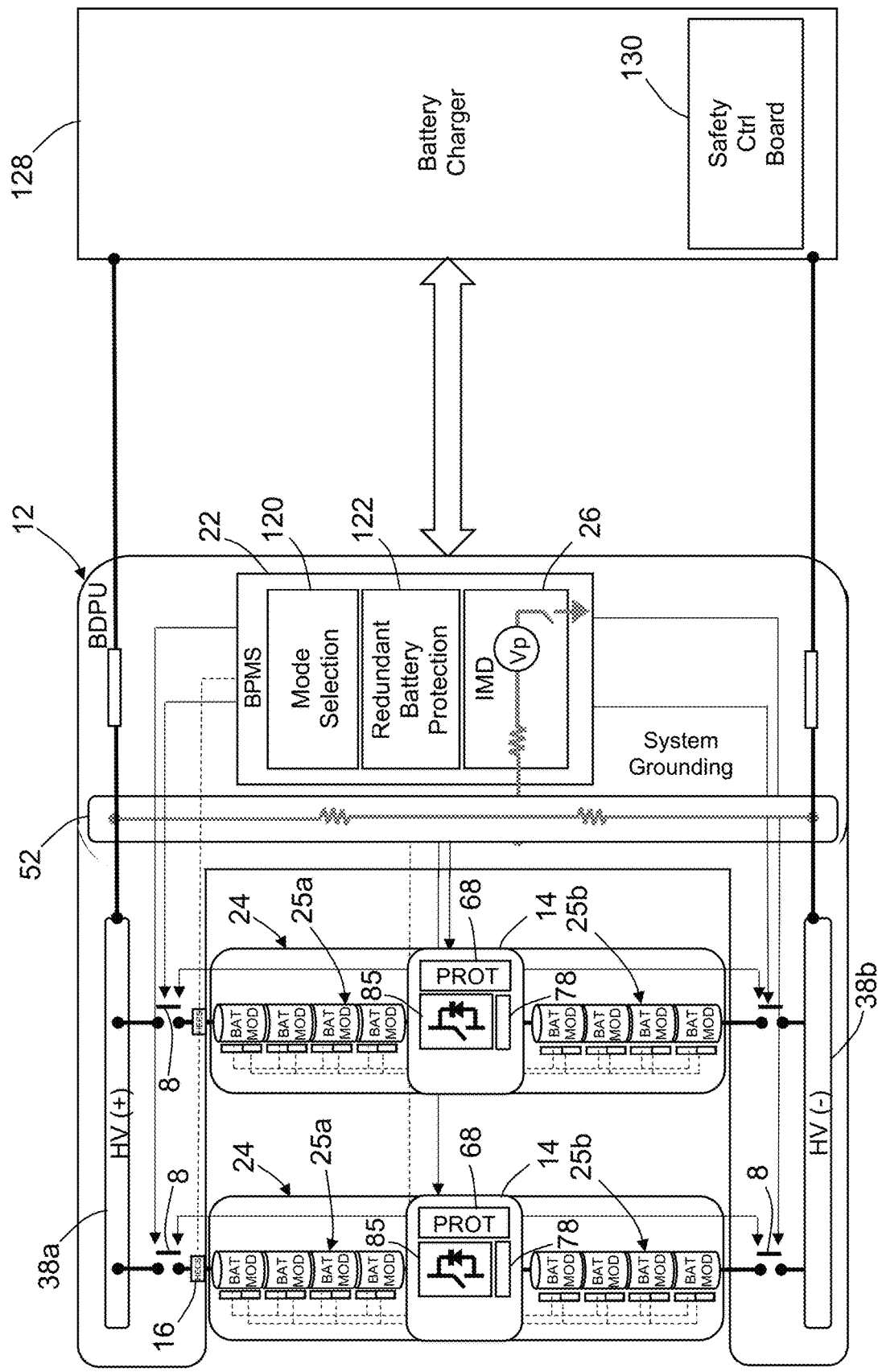
FIG. 15 is a diagram showing a battery power distribution unit and a battery pack management system connected to a battery charger in a charge mode.

FIG. 15 is a diagram showing a battery power distribution unit 12 connected to a battery charger 128 in a charge mode. The battery charger 128 includes a safety control board 130. The double-headed arrow indicates that the BPMS 22 is communicatively coupled to the safety control board 130 of the battery charger 128. The battery power distribution unit 12 further includes high-voltage string contactors 8 and high-voltage load contactors 118 (shown in FIG. 16), the states of which may be controlled by BPMS 22. The BPMS 22 is a controller (e.g., a microprocessor) in charge to implement battery pack protections and coordination functions with aircraft systems. All independent battery strings 24 are connected electrically to the high-voltage busbars 38a and 38b in the battery power distribution unit 12 with a dedicated set of positive/negative contactors per battery string. The string contactors 8 in open position provide galvanic isolation for both positive and negative rails for adequate personal safety measures.

In normal mode, BPMS 22 is controlling the high-voltage contactors to configure the battery pack depending on the operating mode selected by the user in a mode selection module 120. The BPMS controller is configured to coordinate with the different SDMU controllers in the selected operating mode, such as a charge mode (bulk charge, string charge), a discharge mode (active power provided to a high-voltage load), a sleep mode, and an Off mode. For example, the Off mode may involve Lock Out, Tag Out (LOTO), which is a safety procedure used to ensure that machines are properly shut off and not able to be started up again prior to the completion of maintenance or repair work. The isolated power source is locked and a tag is placed on the lock identifying the worker who placed it. The worker then holds the key for the lock, ensuring that only he or she can remove the lock and start the machine. This prevents accidental startup of a machine while it is in a hazardous state or while a worker is in direct contact. Others modes can be easily implemented using the BPMS 22 as a gateway or coordinator with the different battery strings.

The BPMS 22 is also configured to perform string-to-string charge balancing. Before entering discharge or bulk charge mode, the soft start mode is activated to pre-charge the system capacitor. If both battery strings are not charged to the same voltage, circulating current can flow from one string to another. The SMDU soft start mode is used to provide charge equalization between battery strings if required. The circulating current from one string to another is measured by current sensors and the resulting current measurement data is sent to the BPMS 22. The SMDU 28 is commanded to operate in linear soft start mode by BPMS 22 until the circulating current and the string voltage difference are below acceptable thresholds. If the string voltages are too far apart and required a long time to balance, a "string" charge mode can be selected. In that mode, each string will be pre-charged individually to the defined state of charge prior to entering the bulk charge mode. The transition to bulk charge mode will be done by a soft start/equalization mode.

In the charge mode, the BPMS 22 communicates with the battery charger 128 to adjust key charging parameters such as desired charge current or charge voltage depending on charge mode (bulk or single string), cell temperature, and charging profile. Strings can be charge independently from each other or in bulk charge mode. The bulk charging mode is used as the principal charging mode to quickly recharge the overall battery pack. If a new string is connected to the battery pack, single string charging mode is selected to independently charge the new string to an adequate level before connecting to the rest of the battery pack.

In the discharge mode, BPMS 22 configures the string contactors 8 to connect all the available battery strings 24 to the hot high-voltage busbars 38a and 38b and continuously monitors the different strings with help from each SMDU 28. BPMS 22 is further configured to control the load contactors 118 to enable the required loads. BPMS 22 hosts state of charge algorithms based on Coulomb counting and other techniques to report the level of available energy to the airplane. The BPMS 22 also communicates the power available for loads to the main electric propulsion controller 10b (see FIG. 1) depending on the number of battery strings available, state of charge, and cell temperature. Based on this information, the main electrical propulsion controller 10b will actively trim the power applied to propeller 32 to respect the power limitation.

An operation that initiates a particular mode is executed when the BPMS 22 receives a corresponding command from an external controller. The external controller simply provides a discrete signal (high) that corresponds to a certain mode (e.g., a three-position selector switch). To avoid inadvertent activation of another mode, a latching logic can be implemented to ensure that only a selected mode is active. In another embodiment, the charging mode cannot be activated when an aircraft is flying. In a further embodiment, the discharging mode cannot be active if the aircraft is on the ground and the battery's state of charge is below a specified threshold.

The battery power distribution unit 12 includes an integrated neutral grounding network 52 and an IMD 26. The battery pack neutral is connected to mechanical ground through the integrated neutral grounding network 52. The grounding impedance is used to balance the positive and negative bus voltages taking into account the parasitic positive and negative impedances to ground as well as the overall insulating impedance required to guarantee personal safety. A grounding switch can be used to lift the ground connection for sleep mode. The IMD 26 continuously monitors the battery pack and overall propulsion system. More specifically, IMD 26 injects a voltage waveform (square wave type) through the battery pack grounding resistor to measure the positive and negative insulation impedance. The IMD 26 will continuously monitor the battery pack and overall propulsion system. Partial discharges are locally occurring electric discharges that may partially bridge the insulation between conductors in high-voltage electrical systems. They are the result of insulation defects when the electrical field is locally beyond the breakdown strength. Such partial discharges may even lead to further degradation of the insulation between the conductor and possibly breakdown. Therefore, the monitoring of partial discharges in high-voltage systems is needed to prevent malfunction and damage in a power generation chain The BPMS 22 further includes a battery protection module 122 which is configured to provide battery protection which is redundant with the battery protection provided by the battery protection modules 68 of the SMDUs 28. The battery protection module 122 of BPMS 22 implements specific parallel multi-string battery protection. Using dedicated string Hall effect current sensors ("HECS" in FIG. 15), BPMS 22 is able to monitor each string current and detect unbalanced current between strings. If string currents are showing significant imbalance for all battery strings, BPMS 22 can isolate the string that has out-of-bound parameters using string current and others parameters such as cell voltage, cell temperature, and expected current per string.

The "protection" functionality includes programmed responses to overcharge and over-discharge as well as electrical protection. Essentially, "overcharge" is a subset of "protection" functionality. Monitoring for overcharge is activated during battery charging only. The difference is in the method for detection of overcharge: individual cell temperature and voltage are monitored to avoid cell overcharge; virtual cell voltage is monitored to avoid overcharge and an individual string voltage can be monitored as a secondary function (as a sum of individual virtual cell voltages) to avoid the string's overcharge. Upon detecting the "overcharge" condition (which is different from a cells balancing function), the charger is commanded to stop power flow and charging contactors (not shown in FIG. 15) are commanded to open. The overall "protection" function has many additional capabilities to monitor certain conditions (e.g., a short circuit between positive and negative conductors, short or excessive leakage current to ground, temperature rise) and to activate corresponding control loops that launch a pre-determined sequence of protection to mitigate an abnormality. Examples are three different types of faults described below with reference to FIGS. 19 and 20.

Figure 16:
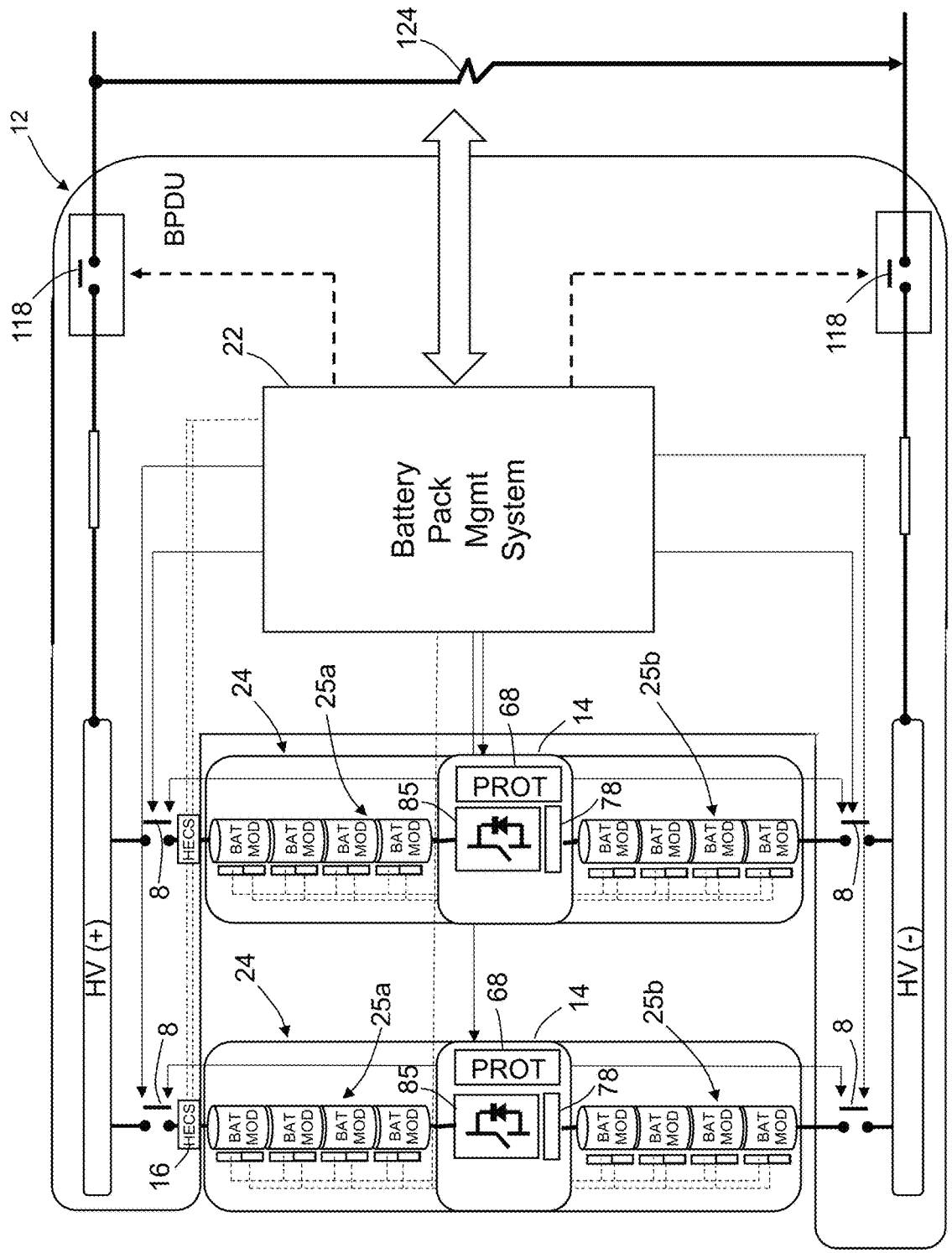
FIG. 16 is a diagram showing a battery pack management system responding to detection of a short circuit.
Figure 17:
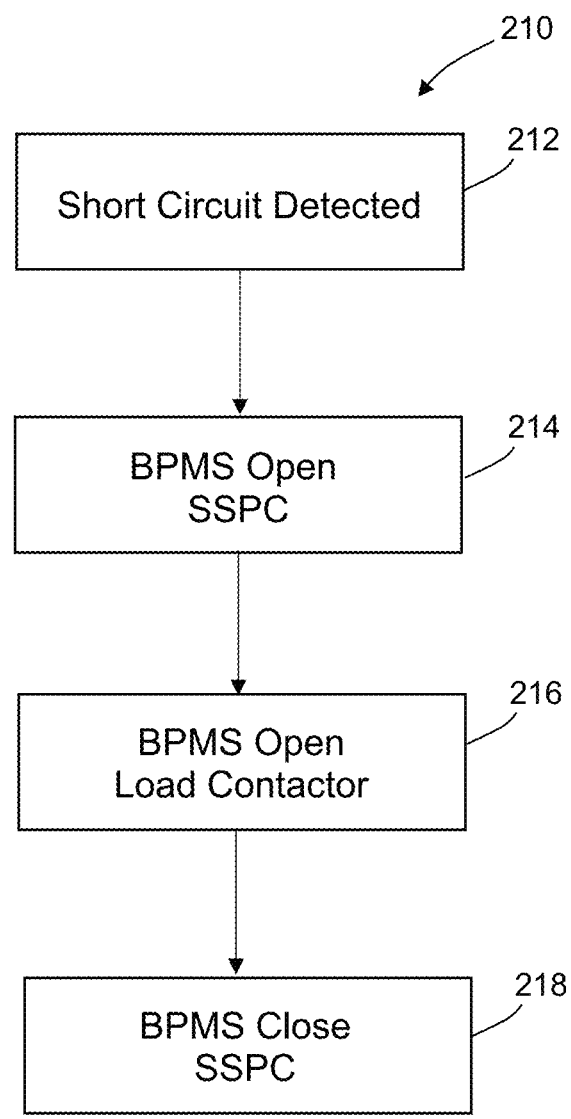
FIG. 17 is a flowchart identifying steps of a fault clearing sequence performed by the battery pack management system depicted in FIG. 16.

FIG. 16 is a diagram showing BPMS 22 responding to detection of a short circuit fault 124. FIG. 17 is a flowchart identifying steps of a fault clearing sequence 210 performed by the BPMS 22 depicted in FIG. 16. First, a short circuit is detected (step 212). In response to detection of the short circuit, the BPMS 22 opens the SSPC (step 214). (As used herein, the phrase "open the SSPC" means open a switch or contactor incorporated in the mid-point disconnect circuit.) After opening the SSPC, the BPMS 22 opens (trips) the load contactors 118 (step 216). After tripping the load contactors 118, the BPMS 22 closes the SSPC.

The BPMS 22 is in charge after string protection trips to reconfigure and reset the different battery strings depending on the reported trips. For example, if one battery string is indicated as having undergone a differential protection trip and all other battery strings are indicating overcurrent or a desaturation protection trip, the BPMS 22 will isolate the faulted battery string tripped by differential protection and reset the non-faulty battery strings tripped by overcurrent or desaturation. A similar sequence can be followed for different fault scenarios where one string is faulty and others are non-faulty (for example over-temperature or open string).

Depending on the number of battery strings available, BPMS 22 will communicate to the electrical propulsion controller to trim the power drawn from the battery pack. BPMS 22 will generate a power limit based on the number of battery strings available, the state of charge of the different battery strings, cell temperature, and the mission profile. The power limit is dynamically adjusted during flight, including in case of battery string failure.

Referring again to FIG. 16, the BPMS 22 and an SMDU 28 work in tandem to enable the optimized system protection fault clearing sequence 210 shown in FIG. 17. BPMS 22 is configured to detect a fault on the load side and then command all SMDUs to open. The SMDUs also sense the fault current and may command mid-point disconnect to open as redundant (secondary) protection to the BPMS protection. In other words, BPMS detection and commanding to open mid-points is the primary protection level and the SMDU's own activation is the secondary protection level to clear a fault in one of the loads.

For example, for a short circuit fault 124 in a high-voltage load, BPMS 22 will command all SMDUs 28 to open their mid-point disconnect circuits (mid-point disconnect contactors 48 seen in FIG. 5 or MOSFETs 88 seen FIG. 6). The BMPS 22 can activate open the high-voltage load contactor 118 to isolate the fault without any short-circuit current. Opening the mid-point disconnect circuits will bring the high-voltage busbar voltage to zero and stop the short-circuit current from reaching the batteries. The high-voltage load contactors 118 can be opened without risk of arcing or high stress. Once the high-voltage load contactor is open, BPMS 22 can ask the SMDUs 28 to re-close their mid-point disconnect circuits to re-establish the high-voltage busbar voltage. The short circuit clearing sequence enables use of an optimized contactor for high-voltage load distribution with opening at zero current/zero voltage. The DC fold back concept is easily implementable due to the fast SSPC control, enabling execution of the fault clearing sequence 210 in a short time period and re-establishment of the busbar voltage quickly after clearing the fault.

For a battery internal failure condition, the BPMS 22 is configured to implement protection which is redundant with the previously described SMDU/MMU1 protection for critical protection against faults such as cell overcharge, over-temperature, and over-discharge. Each module monitoring unit 6b ("MMU2" in FIG. 2A) is monitoring and communicating to BPMS 22 key cell parameters such as $V_{cell2}$ and $T_{cell2}$. In case of failure, the BPMS 22 is configured to use the string contactors 8 (see FIG. 3) as a resettable disconnect in case of a battery protection trip. This action is similar to the action initiated by SMDU 28 and module monitoring unit 6a ("MMU1" in FIG. 2A). Additionally, the BPMS 22 is configured to directly activate the pyro-switch element 66

(see FIG. 6) as redundant non-resettable dissimilar shutdown mechanism if the first (SMDU/MMU1) protection layer did not properly isolate the battery string or pack.

In accordance with the embodiment depicted in FIG. 18, a third protection layer (hereinafter "BPMS "overcharge 3" protection 134") is added for extremely critical events such as overcharge/over-voltage. To enable BPMS "overcharge 3" protection 134 to be simple and robust, it is designed to use only string module voltages or string positive and negative battery pack voltages measured by SMDU over-voltage detection circuitry 140 as monitoring/trigger criteria. If the module voltages (or half string voltages) are significantly unbalanced, the BPMS "overcharge 3" protection 134 is triggered. Additionally, if the module (or half string) voltage exceeds a maximum threshold, the BPMS "overcharge 3" protection 134 is also triggered. The BPMS "overcharge 3" protection 134 will directly communicate to the battery charger "overcharge 3" protection 136 in the safety control board 130 to interrupt the charger power stage. The shutdown mechanism 126 is direct deactivation of the battery charger power stage PWM driver, bypassing the battery charger controller. Optionally, a battery charger contactor can be used to provide an additional shutdown mechanism.

Figure 18:
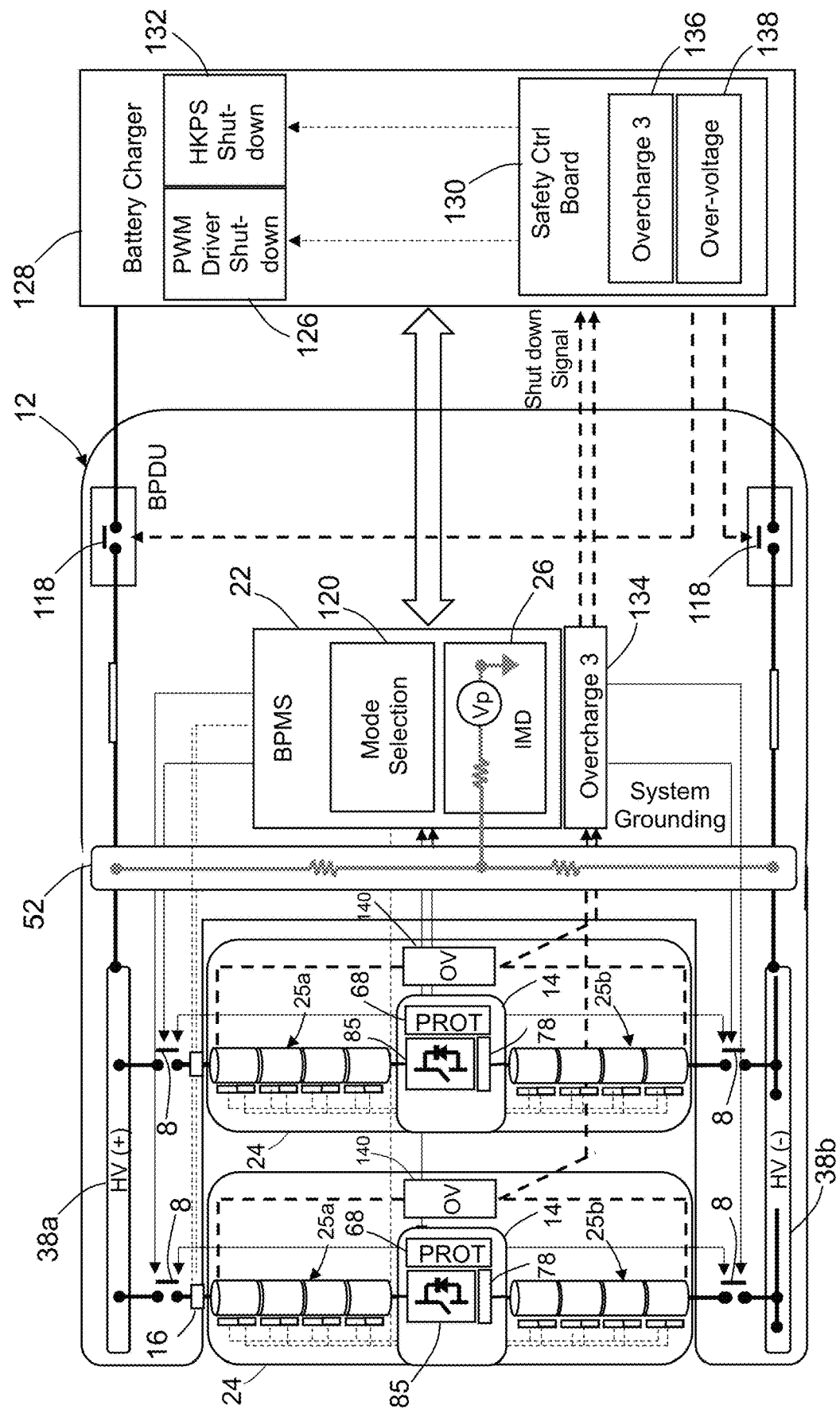
FIG. 18 is a diagram showing a battery power distribution unit and a battery pack management system connected to a battery charger during a scenario in which an overcharge or over-voltage has occurred in a charge mode.

In accordance with the embodiment depicted in FIG. 18, the battery charger 128 further includes a separate over-voltage protection 138 as part of the safety control board 130. The battery charger over-voltage protection 138 is designed to keep the cell voltage $V_{cell}$ below 4.6 $V_{DC}$ if one battery module is short-circuiting or missing (e.g., 7 of 8 battery modules are operational). The over-voltage protection 138 will open the battery charger housekeeping power supply to fully disable the battery charger electronics (indicated as "HKPS shutdown 132" in FIG. 18). (High-power converters used in industrial systems need auxiliary power supplies to support housekeeping needs of the power supply unit. For example, an auxiliary power supply is commonly used to power the internal control electronics and voltage and current feedback sensing electronics of a battery charger. The housekeeping power supply is typically an isolated DC-DC converter generating multiple outputs to power control devices.) Both of the overcharge and over-voltage protection layers can be embedded in the safety control board 130, which board derives its power directly from the battery with its own housekeeping power supply.

In summary, the embodiment depicted in FIG. 18 incorporates the following protection layers: (1) the first shutdown circuit is SMDU/MMU1 opening of a resettable string contactor based on $T_{cell1}$ and $V_{cell1}$ (for example, $V_{cell1} < 4.3$ $V_{DC}$); (2) the second shutdown circuit is BPMS/MMU2 opening of a latch string contactor and pyro-switch activation based on $T_{cell2}$ and $V_{cell2}$ (for example, $V_{cell2} < 4.4$ $V_{DC}$); (3) the third shutdown circuit 3 is BPMS/MMU2/safety control board shutdown of the battery charger driver based on battery module voltage or half-string voltage; and (4) internal battery charger over-voltage protection.

To ensure reliable operation of a system containing multiple parallel battery strings, each individual string has to be monitored for: (a) over-current when a short circuit occurs in the system external to the battery strings on one or more of the loads or between the battery pack's positive and negative high-voltage busbars 38a and 38b; and (b) any difference in currents flowing internal to the battery strings if a short circuit occurs inside the battery pack across one of its battery strings. The former involves the instantaneous trip protection of the entire battery pack (such as the isolation of a single faulted load line or complete shutdown of the system if the fault occurs between the busbars) in the case of the hard fault under the conditions described above and the latter is the selective protection that isolates the faulted battery string such that the battery pack becomes operational after a short reset period. Implementation of the differential protection requires two current sensors on each of the battery strings. The same current sensors may be used for the over-current protection.

Figure 19:
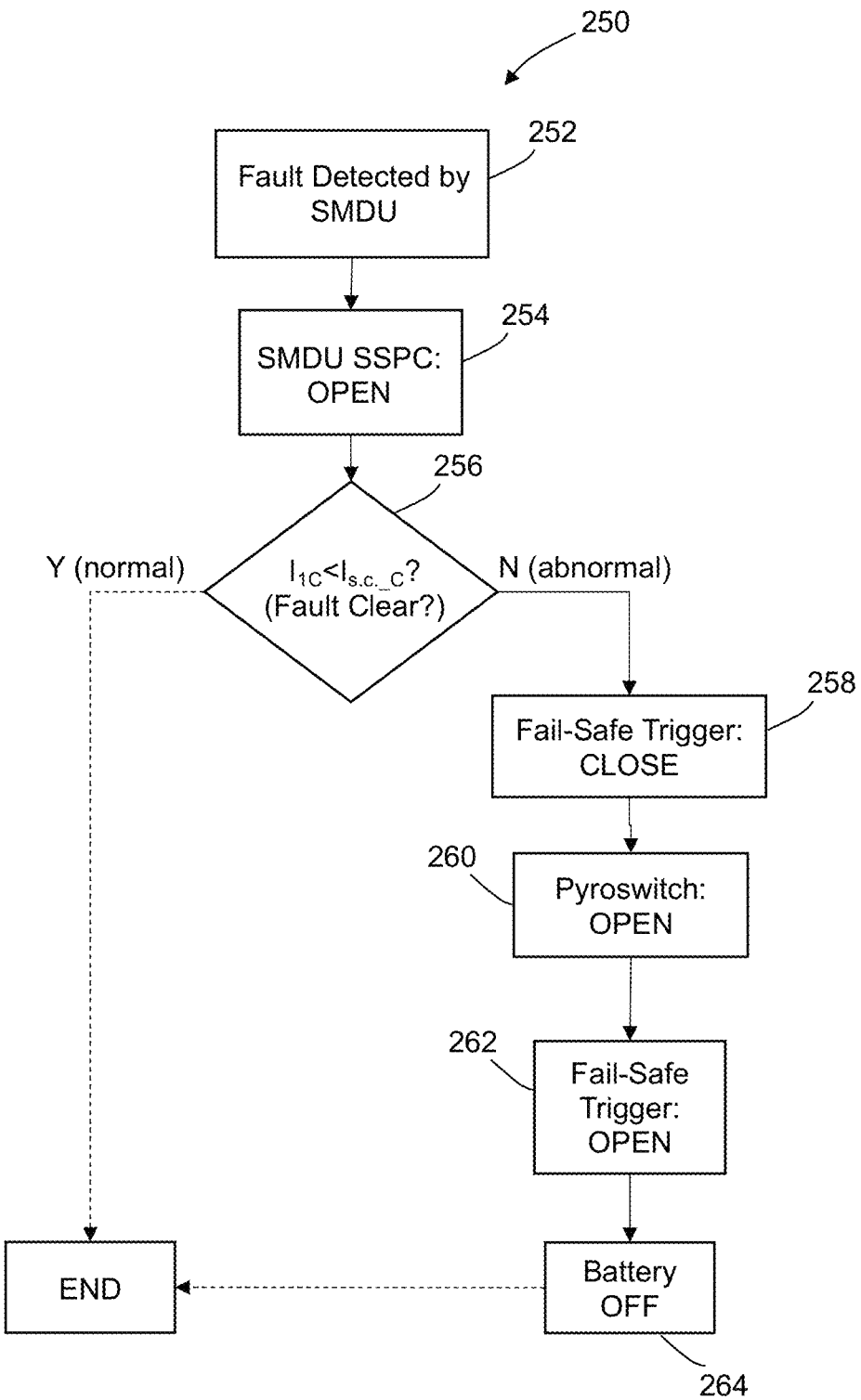
FIG. 19 is a flowchart identifying steps of a generalized algorithm to clear an over-current fault with an extension to disconnect a battery string if the fault-clearing device fails to open or fails short.

FIG. 19 is a flowchart identifying steps of a generalized algorithm 250 to clear an over-current fault with an extension to disconnect a battery string if the fault-clearing device fails to open or fails short. First, the SMDU 28 detects an over-current fault (step 252). In response to detection of the over-current fault, the SMDU 28 opens its SSPC (step 254). (As used herein, the phrase "open the SSPC" means open a switch or contactor incorporated in the mid-point disconnect circuit that is part of the SSPC.) After opening the SSPC, the SMDU 28 determines whether the current $I_{1C}$ through the battery string is less than the short-circuit current $I_{s.c\_C}$ (step 256). On the one hand, if SMDU 28 determines in step 256 that the fault is cleared, then the fault-clearing operation is terminated. On the other hand, if SMDU 28 determines in step 256 that the fault is not cleared, then the fail-safe trigger circuit 86 (see FIG. 6) is closed (step 258). This activates the pyro switch 62 to open (step 260). Then the fail-safe trigger circuit 86 is opened (step 262). As a result the battery string 24 associated with the open pyro switch 62 is disconnected (state 264). The fault-clearing operation is then terminated.

Each SMDU 28 is configured to perform the steps of this algorithm to clear a fault by opening its SSPC with the extension to disconnect a battery string if the SSPC fails to open or fails short. This extension is a fail-safe triggering sequence which is considered to be an abnormal operation that results in a non-recoverable shutdown of the battery pack (since it is based on activating the pyro fuse). It is not the preferred way to clear a fault and is also considered as a last resort that prevents a fire in the battery pack.

Figure 20:
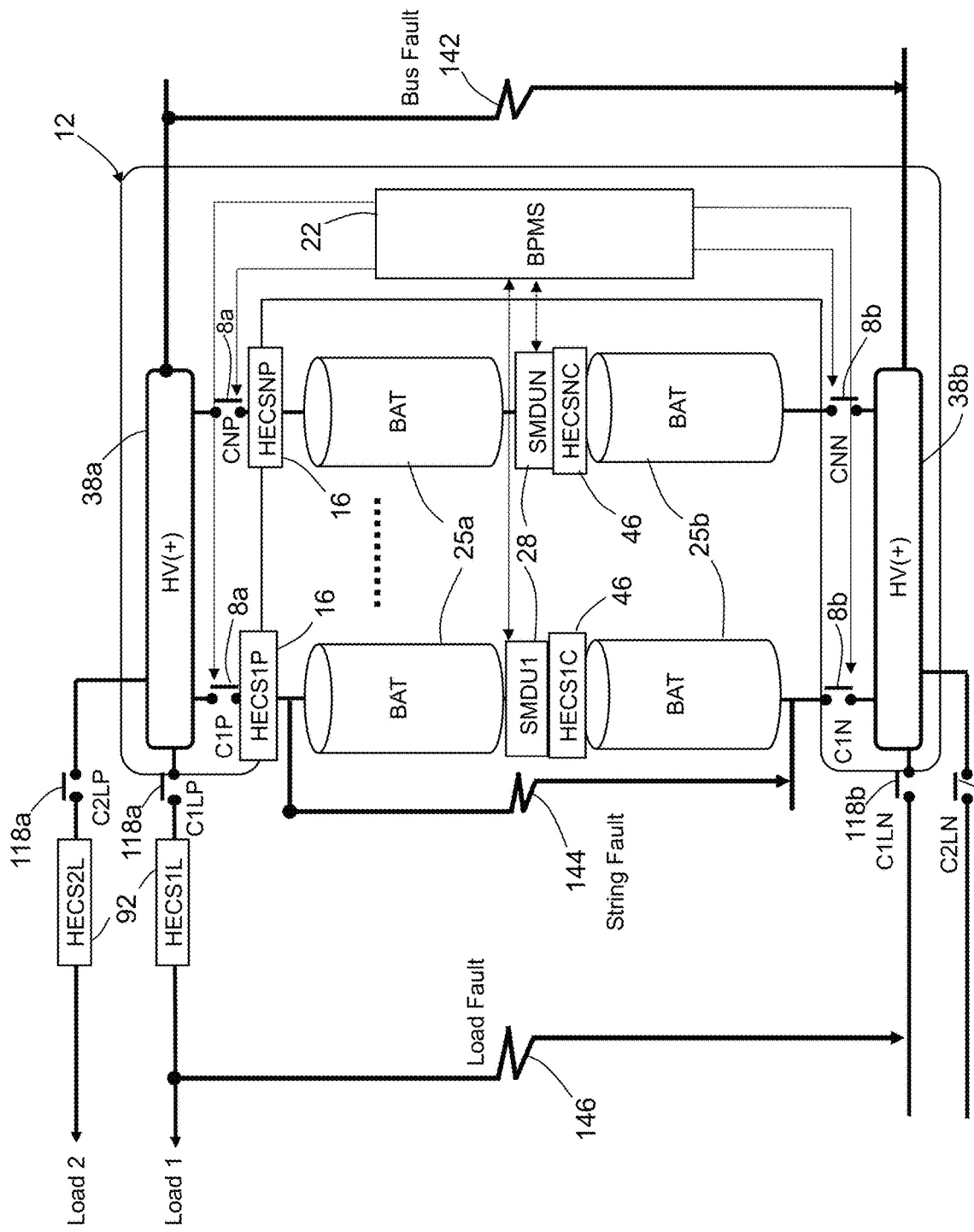
FIG. 20 is a block diagram representing a portion of the system depicted in FIG. 2 in alternative scenarios wherein a bus fault, load fault or string fault has occurred.

FIG. 20 is a block diagram representing a portion of the system depicted in FIG. 2 and involving alternative occurrences of a bus fault 142, a load fault 146, or a string fault 144. The bus fault 142 is a hard short-circuit fault between the positive and negative high-voltage busbars 38a and 38b outside the battery strings 24. The load fault 146 is a hard fault between the positive and negative lines of a single load (Load 1 in this example). The string fault 144 occurs inside the battery pack across one of N battery strings 24 (where N is an integer greater than unity).

Each battery string 24 includes a pair of half-strings 25a and 25b (each half-string including a multiplicity of battery modules connected in series). The battery disconnect/protection system includes a respective mid-point disconnect contactor (not shown in FIG. 20) disposed between half-strings 25a and 25b, a respective string contactor 8a disposed between half-string 25a and positive high-voltage busbar 38a, and a respective string contactor 8b disposed between half-string 25b and negative high-voltage busbar 38b.

The battery disconnect/protection system further includes SMDUs 28 that monitors respective battery strings 24. Each SMDU 28 is configured to perform a battery string protection function that opens a respective mid-point disconnect circuit (not shown in FIG. 20) when a failure is indicated by the current flowing through a respective mid-point current sensor 46. In addition, the differential protection function uses mid-point current measurement data acquired by a mid-point current sensor 46 and current measurement data acquired by an end-point current sensor 16 to measure the difference in current for each of the N battery strings 24. Each SMDU 28 is communicatively coupled to the BPMS 22.

Still referring to FIG. 20, the positive high-voltage busbar 38a is connected to Loads 1 and 2 via respective load contactors 118a, while the negative high-voltage busbar 38b is connected to Loads 1 and 2 via respective load contactors 118b. The load currents are measured by respective load current sensors 92.

For the avoidance of doubt regarding the nomenclature used in FIG. 20, the N SMDUs 28 are respectively identified as SMDU1 through SMDUN; the N mid-point current sensors 46 are respectively identified as HECS1C through HECSNC; the N end-point current sensors 16 are respectively identified as HECS1P through HECSNP; the N string contactors 8a on the positive side are respectively identified as C1P through CNP; and the N string contactors 8b on the negative side are respectively identified as C1N through CNN. In addition, the pair of load contactors 118a are respectively identified as C1LP and C2LP; the pair of load contactors 118b are respectively identified as C1LN and C2LN; and the pair of load current sensors 92 are respectively identified as HECS1L and HECS2L. These same identifiers are referenced in FIG. 21.

Figure 21:
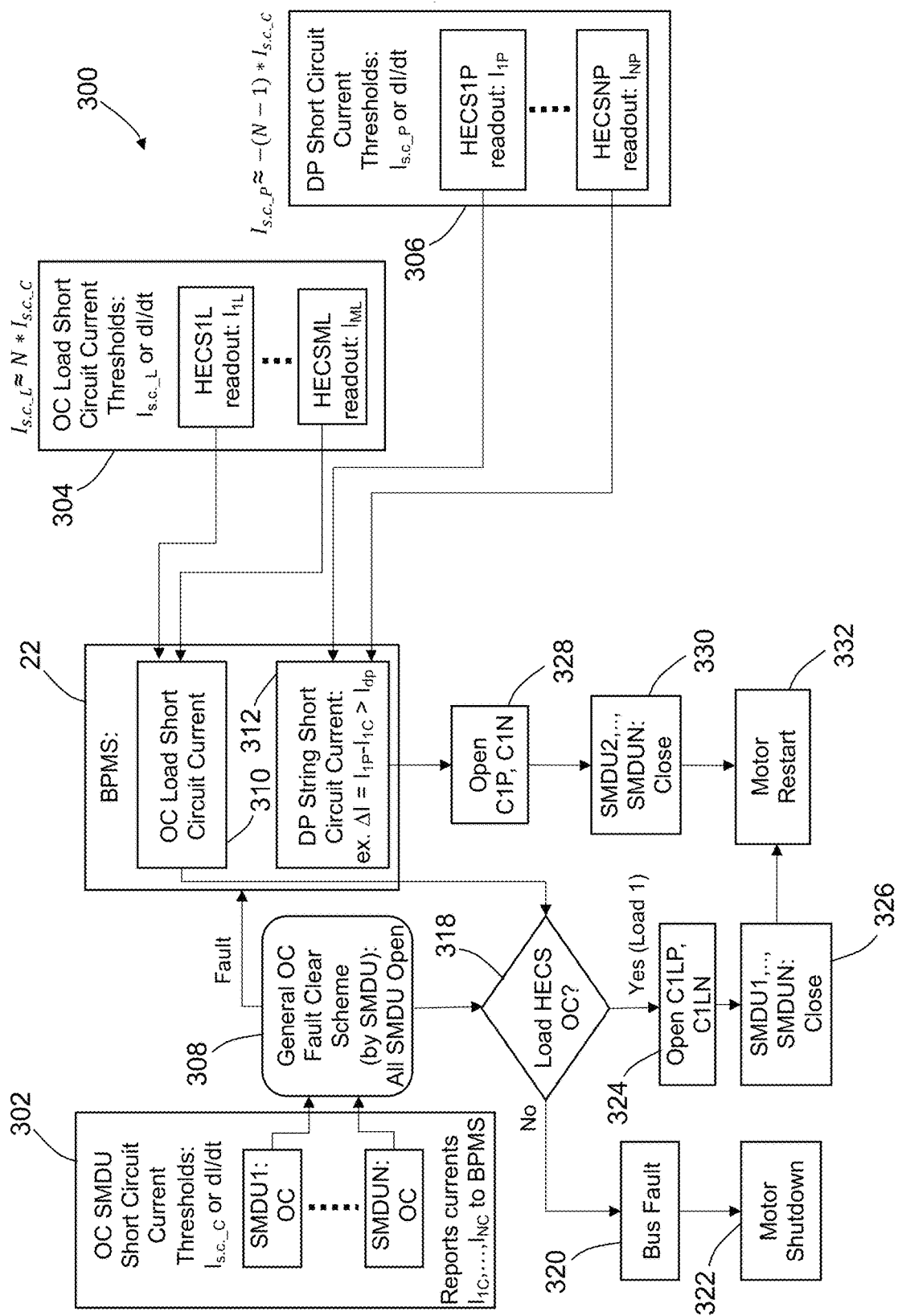
FIG. 21 is a flowchart identifying steps of an algorithm to implement reactions by the battery pack disconnect/protection system to each of the faults depicted in FIG. 20.

FIG. 21 is a flowchart identifying steps of an algorithm 300 to implement selective over-current and differential protection reactions by the battery pack disconnect/protection system to each of the faults depicted in FIG. 20. The nomenclature used is as follows: $I_{1P}$ to $I_{NP}$ are the currents respectively detected by the N end-point current sensors 16; $I_{1C}$ to $I_{NC}$ are the currents respectively detected by the N mid-point current sensors 46; $I_{1L}$ to $I_{ML}$ are the currents respectively detected by the M load current sensors 92; $I_{s.c.\_C} = I_{s.c.\_P}$ is the current threshold for detection of a short circuit by a mid-point current censor 46 and an end-point current sensor 16 in the absence of a differential (i.e., a short-circuit current produced by a single battery string when a short occurs external to the string); $I_{s.c.\_L}$ is the current threshold for detection of a short circuit by a load current sensor 92 when a short occurs on the load side; dI/dt is the threshold for the rate of change of short-circuit current (i.e., how fast the current is rising right after a short occurs in the system; this threshold depends on the chemistry of the battery, but can usually be determined as several hundred amperes per millisecond or greater); and $I_{dp}$ is the differential current threshold (i.e., the threshold for detection of a difference between the currents respectively detected by the end-point current sensor 16 and mid-point current sensor 46 of the same string).

In process 302, the N SDMUs 28 the rate of change is compared to the threshold dI/dt). For overcurrent protection, the SDMUs can use either string currents $I_{1C}$ to $I_{NC}$ or string currents $I_{1P}$ to $I_{NP}$ because the two are usually equal (in the absence of a difference in current indicating a string internal short circuit.

In the case of any fault (bus fault 142, string fault 144, and load fault 146 identified in FIG. 20), each mid-point current sensor 46 (HECSiC, i=1, . . . , N) reports a short-circuit current that is above the threshold value, in which case the over-current fault clear scheme 308 is invoked by the SDMUs. The SDMUs 28 recognize the over-current (OC) fault and the "Over-current=TRUE" state is reported to the BPMS 22 (Fault), indicating that all SMDUs 28 are in the FAULT state. Under this condition, it is assumed that the SSPCs in the SMDUs are open as the part of their normal operation. If one or more SSPCs fails to open, then the corresponding string(s) are commanded to disconnect by activating the pyro fuse (as previously described with reference to FIG. 19), which is abnormal operation.

In process 304, the BPMS 22 receives readouts from the respective M load current sensors 92 (HECSjL, j=1, . . . , M, where M is the number of parallel loads), which load currents $I_{1L}$ to $I_{ML}$ are compared with the threshold $I_{s.c.\_L}$, which threshold can be set as low as $I_{s.c.\_C}$ or as high as $N*I_{s.c.\_C}$. If the detected fault is not a load fault caused by a particular load (i.e., fault 142 or 144 in FIG. 20), then at the same time, the load current sensors 92 report load currents much lower than the load current threshold, nearing zero. This is not the fault condition state for the loads and therefore the loads (e.g., Load 1 and Load 2 seen in FIG. 20) are treated by BMPS 22 as being in the normal state (Load HECS OC? "No"). If the fault has occurred on the busbar, then the mid-point current sensors 46 report a high fault current, while the load current sensors 92 do not report high current and are essentially zeroes (the load current is not approximately equal to the product $N*I_{s.c.\_C}$). Therefore, BMPS 22 receives only fault current reported by the SMDUs 28 and concludes that the fault is on the bus, which ultimately requires that the motor/load be shut down. More specifically, after confirmation that the load fault is cleared by reading zeroes from the load current sensors 92, the motor can be safely commanded to shutdown (step 322). This sequence defines protection activation to mitigate the hard bus fault 320 between the positive and negative high-voltage busbars 38a and 38b.

In contrast, when a fault occurs on the load side, this case has to be differentiated from the fault of the bus. In this case (fault on the load side), the affected load current sensor 92 (HECSjL) reports the load over-current to the BMPS 22. At the same time, all SMDUs 28 report a fault to the BMPS due to the over-current in the SDMUs. In the case of a hard fault between the positive and negative rails of one of the loads (e.g., Load 1 in FIG. 20), in addition to the readings from the mid-point current sensors 46 (HECSiC) that reported the short-circuit current condition, the load current sensor HECS1L (see FIG. 20) reports a very large short-circuit current approximately equal to $N*I_{s.c.\_string}$ (where $I_{s.c.\_string}$ is the short-circuit current of a single string, roughly equal to the short-circuit current in other strings), while the other load current sensor HECSjL may report load currents close to zero. These readouts of load current sensors HECSjL are sufficient for the BPMS 22 to conclude that the short-circuit fault condition occurred on one of the loads (Load 1 in this case, Yes (Load 1)) and shall be cleared by opening the load contactors C1LP and C1LN (step 324) to isolate the faulty load, if the current clearing capability of load contactors C1LP and C1LN is sufficient to interrupt high fault current. Thereafter, the mid-point disconnect contactors of the N SDMUs are all closed (step 326), thereby restoring power flow to the remaining loads. After all of the battery strings have been reconnected to the non-faulted loads, a motor restart 332 is initiated. If the current clearing capability of load contactors C1LP and C1LN is not sufficient to interrupt high fault current without being destroyed, then the SMDU commands all mid-point contactors or SSPC to open first, then to open load contactors C1LP and C1LN, and then to close mid-point SSPCs or contactors.

In process 306, the BPMS 22 receives readouts from the respective N end-point current sensors 16 (HECSiP, i=1, . . . , N, where N is the number of battery strings), which string currents $I_{1P}$ to $I_{MP}$ are compared with the threshold $I_{s.c.\_P}$ by the BPMS 22. In the third case, a fault occurs internal to one of the battery's strings (i=1 in this case). This is the only case when the end-point current sensors 16

(HECSiP) are engaged into the control loops. At large, all the end-point current sensors 16 report the short-circuit current. In addition, at the level where the differential protection function is monitored, the differential protection module reports that the difference in read values between HECS1P and HECS1C is much higher than the pre-set differential threshold ΔI because the currents from the other strings of the battery flow into the short-circuit path and therefore, end-point current sensor HECS1P detects current much higher (by approximately $(N-1)*I_{s.c.\_C}$) and opposite in sign to own string's short-circuit current read by HECS1C, since the current flows into the string to feed the fault (ΔI in the other strings is essential zero). This threshold does not have to be equal in magnitude to $(N-1)*I_{s.c.\_C}$ and can be as low as 10-100 A to decrease activation time for differential protection. Again, the differentials in currents detected by pairs of end-point and midpoint current sensors return values very close to zero at the same time. In this state, the BPMS 22 detects the differential protection condition of the first string (i=1) in addition to over-current (Yes (first string)). The sequence of protection activation to clear the fault is similar as described in the previous paragraph for the load fault. The string fault is cleared by opening the string contactors C1P and C1N (step 328) to isolate the faulty battery string. Thereafter, the mid-point disconnect contactors of the other (N−1) SDMUs (SMDU2-SMDUN) are closed (step 330), thereby restoring power flow to the remaining battery strings. After all of the battery strings have been reconnected to the busbars, the motor restart 332 is initiated.

To briefly summarize the foregoing, the fault condition is detected as follows: in the faulted string (first string, in this example), the mid-point current sensor HECS1C reports a high faulted current, approximately the same as all other (N−1) mid-point current sensors 46. This indicates an over-current condition. The load current sensors 92 do not report the high fault current; therefore, the detected fault is not on the load side. The BPMS 22 then determines whether the fault is a bus fault or a string fault. If all the end-point current sensors 16 report approximately the same current as is reported by the respective mid-point current sensors 46 ($\Delta I = I_{1P} - I_{1C} = I_{dp} \approx 20$ A), then the BPMS 22 determines that a bus fault has occurred. In contrast, in the case of a string fault, the end-point current sensor HECS1P reports a very high negative current equal to approximately $-(N-1)I_{s.c.\_C}$. This is the second condition needed to conclude that the detected fault is a string fault because if one calculates ΔI as a subtraction of absolute values of the currents detected by current sensors HECS1C and HECS1P, one would obtain approximately $(N-2)I_{s.c.\_C}$, which is much greater than the differential protection threshold value $I_{dp}=20$ A. Thus, as soon as the string fault condition is detected, the BPMS 22 executes isolation of the faulted string and reconfigures the battery to operate in the (N−1) configuration (having one less operational battery string).

The foregoing protection scheme is originally designed to provide (N−1) redundancy on availability of the battery strings. However, it may be further reduced to (N−2), (N−3), etc. number of potentially faulted strings that, by excluding them, may ensure completeness of the required mission. Also, acceptable reduction in the motor's power output during a mission may help in determining the minimal level of this redundancy.

When the load fault and string faults are being cleared, the BPMS 22 issues a time delay (τ) command between opening mid-tap SSPCs and opening string contactors C1P and C1N and load contactors C1LP and C1LN to respectively isolate the string and the load. The reason is that the excessive current may still flow into the faulted location before contactors open to provide galvanic isolation. Delay τ therefore mitigates any variance in synchronization of the opening of the mid-tap SSPCs of the N SDMUs 28.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

The embodiments disclosed above use one or more processing or computing devices. Such devices typically include a processor, processing device, or controller, such as a general-purpose central processing unit, a microcontroller, a reduced instruction set computer processor, an application specific integrated circuit, a programmable logic circuit, a field-programmable gate array, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

While systems and methods for smart battery protection/disconnect in airborne high-power/energy high-voltage modular multi-string battery packs have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The invention claimed is:
1. A battery system comprising:
   positive and negative busbars;
   a battery pack comprising a first battery string that includes first and second half-strings;

a first string contactor connected to the positive busbar and to the first half-string;

a first mid-point disconnect circuit connected to the first and second half-strings;

a first mid-point current sensor configured to measure current flowing through the first mid-point disconnect circuit; and a first smart mid-point disconnect unit configured to open the first mid-point disconnect circuit following receipt of an output from the first mid-point current sensor indicating over-current flowing through the first mid-point disconnect circuit, wherein the first smart mid-point disconnect unit is further configured to open the first string contactor after opening the first mid-point disconnect circuit.

2. The battery system as recited in claim 1, further comprising a second string contactor connected to the negative busbar and to the second half-string, wherein the first smart mid-point disconnect unit is further configured to open the second string contactor after opening the first mid-point disconnect circuit.

3. The battery system as recited in claim 1, wherein the first mid-point disconnect circuit comprises a mid-point disconnect contactor.

4. The battery system as recited in claim 1, wherein the first mid-point disconnect circuit comprises a semiconductor switch.

5. The battery system as recited in claim 2, wherein the battery pack further comprises a second battery string that includes third and fourth half-strings, the system further comprising:

a third string contactor connected to the positive busbar and to the third half-string;

a fourth string contactor connected to the negative busbar and to the fourth half-string;

a second mid-point disconnect circuit connected to the third and fourth half-strings;

a second mid-point current sensor configured to measure current flowing through the second mid-point disconnect circuit; and a second smart mid-point disconnect unit configured to open the second mid-point disconnect circuit and the third string contactor in response to receipt of an output from the second mid-point current sensor indicating over-current flowing through the second mid-point disconnect circuit.

6. The battery system as recited in claim 5, further comprising a battery pack management system which is communicatively coupled to the first and second smart mid-point disconnect units.

7. The battery system as recited in claim 6, further comprising:

a fourth string contactor connected to the negative busbar and to the fourth half-string;

a first end-point current sensor configured to measure current flowing through the first string contactor; and a second end-point current sensor configured to measure current flowing through the third string contactor, wherein the battery pack management system is configured to:

compute a first difference between the currents measured by the first mid-point current sensor and first end-point current sensor;

open the first mid-point disconnect circuit in response to the first difference being greater than a specified threshold and then open the first and second string contactors;

compute a second difference between the currents measured by the second mid-point current sensor and second end-point current sensor; and open the second mid-point disconnect circuit in response to the second difference being greater than the specified threshold and then open the third and fourth string contactors.

8. The battery system as recited in claim 7, wherein the battery pack management system is further configured to:

close the second mid-point disconnect circuit after opening the first and second string contactors; and close the first mid-point disconnect circuit after opening the third and fourth string contactors.

9. The battery system as recited in claim 1, further comprising a module monitoring unit communicatively coupled to the first smart mid-point disconnect unit and comprising sensors for measuring virtual cell voltage and individual cell temperature inside a battery module of the first half-string and a balancing circuit, wherein the first smart mid-point disconnect unit is further configured to control a balancing function performed by the balancing circuit as a function of the measured virtual cell voltage and individual cell temperature.

10. A battery system comprising:

positive and negative busbars;

a battery pack comprising a first battery string that includes first and second half-strings;

a first string contactor connected to the positive busbar and to the first half-string;

a mid-point disconnect circuit connected to the first and second half-strings, wherein the mid-point disconnect circuit comprises a semiconductor switch;

a mid-point current sensor configured to measure current flowing through the mid-point disconnect circuit, wherein;

a smart mid-point disconnect unit configured to open the mid-point disconnect circuit following receipt of an output from the mid-point current sensor indicating over-current flowing through the mid-point disconnect circuit; and a pyro fuse connected in series with the mid-point disconnect circuit, wherein the smart mid-point disconnect unit is further configured to activate the pyro fuse in response to failure of the semiconductor switch to open.

11. The battery system as recited in claim 10, further comprising a fuse connected in parallel with the pyro fuse.

12. The battery system as recited in claim 10, wherein the smart mid-point disconnect unit is further configured to open the first string contactor after opening the mid-point disconnect circuit.

13. A battery system comprising:

positive and negative busbars;

a battery pack comprising a first battery string that includes first and second half-strings;

a first string contactor connected to the positive busbar and to the first half-string;

a mid-point disconnect circuit connected to the first and second half-strings;

a mid-point current sensor configured to measure current flowing through the mid-point disconnect circuit;

a smart mid-point disconnect unit configured to open the mid-point disconnect circuit following receipt of an output from the mid-point current sensor indicating over-current flowing through the mid-point disconnect circuit;

a battery pack management system which is communicatively coupled to the smart mid-point disconnect unit;
a first load contactor connected to the positive busbar;
a second load contactor connected to the negative busbar; and
a load current sensor configured to measure current flowing through the first load contactor,
wherein the battery pack management system is configured to:
open the first and second load contactors following receipt of data from the load current sensor indicating a load fault; and
close the mid-point disconnect circuit after opening the first and second load contactors;
close the mid-point disconnect circuit after opening the first and second load contactors.

14. The battery system as recited in claim 13, wherein the smart mid-point disconnect unit is further configured to open the first string contactor after opening the mid-point disconnect circuit.

15. The battery system as recited in claim 14, further comprising a second string contactor connected to the negative busbar and to the second half-string, wherein the smart mid-point disconnect unit is further configured to open the second string contactor after opening the mid-point disconnect circuit.

16. The battery system as recited in claim 13, further comprising a pyro fuse connected in series with the mid-point disconnect circuit, wherein the first smart mid-point disconnect unit is further configured to activate the pyro fuse in response to failure of the mid-point disconnect circuit to open.

17. A battery system comprising:
positive and negative busbars;
a battery pack comprising a first battery string that includes first and second half-strings;
a first string contactor connected to the positive busbar and to the first half-string;
a mid-point disconnect circuit connected to the first and second half-strings;
a mid-point current sensor configured to measure current flowing through the mid-point disconnect circuit;
a smart mid-point disconnect unit configured to open the mid-point disconnect circuit following receipt of an output from the mid-point current sensor indicating over-current flowing through the mid-point disconnect circuit;
an electric propulsion controller; and
a battery pack management system which is communicatively coupled to the smart mid-point disconnect unit and to the electric propulsion controller,
wherein the battery pack management system is configured to output a power limit command to the electric propulsion controller to trim power drawn from the battery pack, the power limit command being based on a number of battery strings available, a state of charge of the battery strings, and a mission profile.

18. The battery system as recited in claim 17, wherein the smart mid-point disconnect unit is further configured to open the first string contactor after opening the mid-point disconnect circuit.

19. The battery system as recited in claim 18, further comprising a second string contactor connected to the negative busbar and to the second half-string, wherein the smart mid-point disconnect unit is further configured to open the second string contactor after opening the mid-point disconnect circuit.

20. The battery system as recited in claim 17, further comprising a pyro fuse connected in series with the mid-point disconnect circuit, wherein the first smart mid-point disconnect unit is further configured to activate the pyro fuse in response to failure of the mid-point disconnect circuit to open.

21. A battery system comprising:
positive and negative busbars;
a battery pack comprising a first battery string that includes first and second half-strings;
a first string contactor connected to the positive busbar and to the first half-string;
a mid-point disconnect circuit connected to the first and second half-strings;
a mid-point current sensor configured to measure current flowing through the mid-point disconnect circuit; and
a smart mid-point disconnect unit configured to open the mid-point disconnect circuit following receipt of an output from the mid-point current sensor indicating over-current flowing through the mid-point disconnect circuit,
wherein the smart mid-point disconnect unit is further configured to execute a soft start control algorithm for optimizing a trajectory of current passing through the mid-point disconnect circuit in order to pre-charge a capacitor installed between the positive and negative busbars.

* * * * *